(12) United States Patent
Chen et al.

(10) Patent No.: US 11,709,664 B2
(45) Date of Patent: Jul. 25, 2023

(54) ANTI-CONGESTION FLOW CONTROL FOR RECONFIGURABLE PROCESSORS

(71) Applicant: SambaNova Systems, Inc., Palo Alto, CA (US)

(72) Inventors: Weiwei Chen, Mountain View, CA (US); Raghu Prabhakar, San Jose, CA (US); David Alan Koeplinger, Menlo Park, CA (US); Sitanshu Gupta, San Jose, CA (US); Ruddhi Arun Chaphekar, Santa Clara, CA (US); Ajit Punj, San Jose, CA (US); Sumti Jairath, Santa Clara, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 463 days.

(21) Appl. No.: 16/890,841

(22) Filed: Jun. 2, 2020

(65) Prior Publication Data
US 2021/0373867 A1 Dec. 2, 2021

(51) Int. Cl.
G06F 8/41 (2018.01)
G06F 15/78 (2006.01)
G06F 15/82 (2006.01)

(52) U.S. Cl.
CPC .......... *G06F 8/452* (2013.01); *G06F 8/41* (2013.01); *G06F 15/7867* (2013.01); *G06F 15/825* (2013.01)

(58) Field of Classification Search
None
See application file for complete search history.

(56) References Cited

U.S. PATENT DOCUMENTS

| 6,636,223 B1 * | 10/2003 | Morein | G09G 5/393 |
| | | | 345/581 |
| 7,369,637 B1 * | 5/2008 | Mauer | H03H 17/028 |
| | | | 370/914 |

(Continued)

FOREIGN PATENT DOCUMENTS

| WO | 2010142987 A1 | 12/2010 |
| WO | 2019202216 A2 | 10/2019 |

OTHER PUBLICATIONS

Zhao et al. "Serving Recurrent Neural Networks Efficiently with a Spatial Accelerator", 2019, Proceedings of the 2nd sysML Conference. (Year: 2019).*

(Continued)

*Primary Examiner* — Jason D Mitchell
(74) *Attorney, Agent, or Firm* — Flagship Patents; Sikander Khan; Bruce Young

(57) ABSTRACT

A compiler configured to configure memory nodes with a ready-to-read credit counter and a write credit counter. The ready-to-read credit counter of a particular upstream memory node initialized with as many read credits as a buffer depth of a corresponding downstream memory node. The ready-to-read credit counter configured to decrement when a buffer data unit is written by the particular upstream memory node into the corresponding downstream memory node, and to increment when the particular upstream memory node receives from the corresponding downstream memory node a read ready token. The write credit counter of the particular upstream memory node initialized with one or more write credits and configured to decrement when the particular upstream memory node begins writing the buffer data unit into the corresponding downstream memory node, and to increment when the particular upstream memory node (Continued)

receives from the corresponding downstream memory node a write done token.

31 Claims, 16 Drawing Sheets
(11 of 16 Drawing Sheet(s) Filed in Color)

(56) References Cited

U.S. PATENT DOCUMENTS

| | | | |
|---|---|---|---|
| 2004/0068612 A1* | 4/2004 | Stolowitz | G06F 11/1076 |
| | | | 714/E11.034 |
| 2004/0208173 A1* | 10/2004 | Di Gregorio | G06F 13/1689 |
| | | | 370/360 |
| 2007/0011396 A1* | 1/2007 | Singh | G06F 13/4059 |
| | | | 711/105 |
| 2010/0161948 A1* | 6/2010 | Abdallah | G06F 9/3009 |
| | | | 712/228 |
| 2010/0191878 A1* | 7/2010 | Nandagopalan | H04L 47/30 |
| | | | 710/56 |
| 2018/0129624 A1* | 5/2018 | Krutsch | G06F 15/76 |
| 2018/0204117 A1* | 7/2018 | Brevdo | G06N 3/0445 |
| 2018/0210730 A1 | 7/2018 | Sankaralingam et al. | |
| 2018/0212894 A1 | 7/2018 | Nicol et al. | |
| 2018/0300181 A1 | 10/2018 | Hetzel et al. | |
| 2019/0057053 A1* | 2/2019 | Tsuchida | G06F 13/28 |
| 2019/0130269 A1 | 5/2019 | Nicol | |
| 2019/0229996 A1 | 7/2019 | ChoFleming, Jr. et al. | |
| 2019/0392296 A1* | 12/2019 | Brady | G06N 3/063 |
| 2020/0005155 A1 | 1/2020 | Datta et al. | |
| 2020/0034306 A1 | 1/2020 | Luo et al. | |
| 2020/0241797 A1* | 7/2020 | Kanno | G06F 3/0688 |
| 2020/0387397 A1* | 12/2020 | Ohta | G06F 11/0751 |
| 2021/0042259 A1* | 2/2021 | Koeplinger | G06F 15/7867 |
| 2021/0081769 A1* | 3/2021 | Chen | G06F 15/7892 |
| 2021/0182021 A1* | 6/2021 | Wang | G06F 5/01 |
| 2022/0057958 A1* | 2/2022 | Patriarca | G06F 3/061 |

OTHER PUBLICATIONS

PCT/US2021/035305—International Search Report and Written Opinion dated Sep. 1, 2021, 17 pages.

Podobas et al, A Survey on Coarse-Grained Reconfigurable Architectures From a Performance Perspective, IEEEAccess, vol. 2020.3012084, Jul. 27, 2020, 25 pages.

M. Emani et al., "Accelerating Scientific Applications With SambaNova Reconfigurable Dataflow Architecture," in Computing in Science & Engineering, vol. 23, No. 2, pp. 114-119, Mar. 1-Apr. 2021, doi: 10.1109/MCSE.2021.3057203.

Prabhakar, Design of Programmable, Energy-Efficient Reconfigurable Accelerators, Stanford University, dated Aug. 2018, 104 pages.

Jung, Optimization of the Memory Subsystem of a Coarse Grained Reconfigurable Hardware Accelerator, Technical University at Darmstadt, dated 2019, 184 pages.

Prabhakar et al., "Plasticine: A Reconfigurable Architecture for Parallel Patterns", ISCA '17, Jun. 24-28, 2017, Toronto, ON, Canada.

Koeplinger et al., Spatial: A Language and Compiler for Application Accelerators, Proceedings of the 39th ACM SIGPLAN Conference On Programming Language Design And Embodiment (PLDI), Proceedings of the 43rd International Symposium on Computer Architecture, 2018.

IEEE search results, Year: 2021, 7 pages.

U.S. Appl. No. 17/023,015—Notice of Allowance dated Sep. 30, 2021, 9 pages.

PCT/US2021/050586—International Search Report and Written Opinion, dated Jan. 18, 2022, 16 pages.

PCT/US2021/051305—International Search Report and Written Opinion, dated Jan. 11, 2022, 16 pages.

Rotem et al., Glow: Graph Lowering Compiler Techniques for Neural Networks, Cornell University Library, New York, dated May 2, 2018, 12 pages.

* cited by examiner

| Stage | Producers | Consumers |
|---|---|---|
| S0 | [Not Shown] | A,B,C |
| S1 | A,B,C | L |
| S1.0 | D, E | F |
| S1.1 | F | G |
| S1.2 | G | H |
| S1.3 | H | I |
| S1.4 | I,J | K |
| S2 | L | [Not Shown] |

FIG. 7

ANTI-CONGESTION FLOW CONTROL FOR RECONFIGURABLE PROCESSORS

FIELD OF THE TECHNOLOGY DISCLOSED

The present technology relates to configuration of reconfigurable architectures and can be particularly applied to flow control logic for coarse-grained reconfigurable architectures and other distributed execution systems.

INCORPORATIONS

The following are incorporated by reference for all purposes as if fully set forth herein:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language And Compiler For Application Accelerators," *Proceedings Of The 39th ACM SIGPLAN Conference On Programming Language Design And Embodiment* (PLDI), Proceedings of the 43rd International Symposium on Computer Architecture, 2018;

U.S. Nonprovisional patent application Ser. No. 16/239,252, now U.S. Pat. No. 10,698,853 B1, filed Jan. 3, 2019, entitled, "VIRTUALIZATION OF A RECONFIGURABLE DATA PROCESSOR;"

U.S. Nonprovisional patent application Ser. No. 16/197,826, now U.S. Pat. No. 10,831,507 B2, filed Nov. 21, 2018, entitled, "CONFIGURATION LOAD OF A RECONFIGURABLE DATA PROCESSOR;"

U.S. Nonprovisional patent application Ser. No. 16/198,086, now U.S. Pat. No. 11,188,497 B2, filed Nov. 21, 2018, entitled, "CONFIGURATION UNLOAD OF A RECONFIGURABLE DATA PROCESSOR;"

U.S. Nonprovisional patent application Ser. No. 16/260,548, now U.S. Pat. No. 10,768,899 B2, filed Jan. 29, 2019, entitled, "MATRIX NORMAL/TRANSPOSE READ AND A RECONFIGURABLE DATA PROCESSOR INCLUDING SAME;"

U.S. Nonprovisional patent application Ser. No. 16/536,192, now U.S. Pat. No. 11,080,227 B2, filed Aug. 8, 2019, entitled, "COMPILER FLOW LOGIC FOR RECONFIGURABLE ARCHITECTURES;"

U.S. Nonprovisional patent application Ser. No. 16/407,675, now U.S. Pat. No. 11,386,038 B2, filed May 9, 2019, entitled, "CONTROL FLOW BARRIER AND RECONFIGURABLE DATA PROCESSOR;"

U.S. Nonprovisional patent application Ser. No. 16/504,627, now U.S. Pat. No. 11,055,141 B2, filed Jul. 8, 2019, entitled, "QUIESCE RECONFIGURABLE DATA PROCESSOR;"

U.S. Nonprovisional patent application Ser. No. 16/572,516, filed Sep. 16, 2019, entitled, "EFFICIENT EXECUTION OF OPERATION UNIT GRAPHS ON RECONFIGURABLE ARCHITECTURES BASED ON USER SPECIFICATION;"

U.S. Nonprovisional patent application Ser. No. 16/744,077, filed Jan. 15, 2020, entitled, "COMPUTATIONALLY EFFICIENT SOFTMAX LOSS GRADIENT BACKPROPAGATION;"

U.S. Nonprovisional patent application Ser. No. 16/590,058, now U.S. Pat. No. 11,327,713 B2, filed Oct. 1, 2019, entitled, "COMPUTATION UNITS FOR FUNCTIONS BASED ON LOOKUP TABLES;"

U.S. Nonprovisional patent application Ser. No. 16/695,138, now U.S. Pat. No. 11,328,038 B2, filed Nov. 25, 2019, entitled, "COMPUTATION UNITS FOR BATCH NORMALIZATION;"

U.S. Nonprovisional patent application Ser. No. 16/688,069, now U.S. Pat. No. 11,327,717 B2, filed Nov. 19, 2019, entitled, "LOOK-UP TABLE WITH INPUT OFFSETTING;"

U.S. Nonprovisional patent application Ser. No. 16/718,094, now U.S. Pat. No. 11,150,872 B2, filed Dec. 17, 2019, entitled, "COMPUTATION UNITS FOR ELEMENT APPROXIMATION;"

U.S. Nonprovisional patent application Ser. No. 16/560,057, now U.S. Pat. No. 11,327,923 B2, filed Sep. 4, 2019, entitled, "SIGMOID FUNCTION IN HARDWARE AND A RECONFIGURABLE DATA PROCESSOR INCLUDING SAME;"

U.S. Nonprovisional patent application Ser. No. 16/572,527, now U.S. Pat. No. 11,410,027 B2, filed Sep. 16, 2019, entitled, "PERFORMANCE ESTIMATION-BASED RESOURCE ALLOCATION FOR RECONFIGURABLE ARCHITECTURES;" and U.S. Nonprovisional patent application Ser. No. 15/930,381, now U.S. Pat. No. 11,250,105 B2, filed May 12, 2020, entitled, "COMPUTATIONALLY EFFICIENT GENERAL MATRIX-MATRIX MULTIPLICATION (GeMM)."

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to embodiments of the claimed technology.

Reconfigurable processors, including field programmable gate arrays (FPGAs), can be configured to implement a variety of functions more efficiently or faster than might be achieved using a general purpose processor executing a computer program. So-called coarse-grained reconfigurable architectures (CGRAs) are being developed in which the configurable units in the array are more complex than used in typical, more fine-grained FPGAs, and may enable faster or more efficient execution of various classes of functions. For example, CGRAs have been proposed that can enable embodiment of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

In CGRAs and other processing systems that comprise a plurality of processing units that participate in a data processing operation, part of the data processing operation to be executed in one processing unit may need to be synchronized with other parts being executed in processing units distributed across the system. For example, several parts of the data processing operation may need to complete before a next part can safely begin. Thus, techniques for distributing control signals among elements of the processing system are required.

Unlike conventional architectures like CPUs, CGRAs do not have a central control management mechanism in hardware such as a program counter and a serial instruction stream. Flow control for executing nested dataflow graphs on CGRAs involves exchanging control events (or tokens) to manage the rate of execution of pipeline stages and prevent buffer overflows and processing bottlenecks.

Manually programming and managing the flow control is tedious, error prone, and does not scale to large, complicated dataflow graphs that are common in state-of-the-art machine learning and deep learning workloads like language models and convolutional neural networks. Consequently, harnessing the benefits of CGRAs necessitates designing flow control protocols in the compiler to automatically manage the flow of data and control information to implement arbitrary dataflow pipelines using the distributed compute and memory components of CGRAs.

In order to maximize operating efficiency, and to be able to coordinate among processing units on a processing system, a means of efficiently managing control signaling is needed.

SUMMARY

A technology is described which enables efficient control signaling among processing units of a data processing system, including among reconfigurable processing units of a coarse-grained reconfigurable array processor.

A system is described that comprises memory and a compiler. The memory stores a dataflow graph with compute nodes that asynchronously transmit data along data connections. The dataflow graph includes a loop nest in which loops are arranged in a hierarchy of levels, such that a loop at a second level is within a loop at a first level.

The compiler has access to the memory and is configured (i) to partition execution of the dataflow graph into two or more asynchronous stages by inserting stage buffers inside the loop at the second level and at input/output boundaries between the loop at the first level and the loop at the second level, (ii) to classify the stage buffers as producers and consumers on a stage-by-stage basis by classifying those stage buffers that provide input data to a particular stage as the producers, and classifying those stage buffers that store output data from the particular stage as the consumers, (iii) to create control connections between the stage buffers by extending the control connections from the consumers in the particular stage to the producers in the particular stage, and (iv) to control data transmission between the compute nodes along the data connections by using the control connections to control writing of the data by the producers into the consumers.

The compiler is further configured to insert additional stage buffers inside the loop at the second level. The additional stage buffers are configured to interface with the stage buffers inserted at the input/output boundaries between the loop at the first level and the loop at the second level.

The control connections extend from a particular consumer to one or more corresponding producers that write data into the particular consumer.

The compiler is further configured to configure each of the producers with a ready-to-read credit counter, such that the ready-to-read credit counter of a particular producer is initialized with as many read credits as a buffer depth of a corresponding consumer that reads data from the particular producer. The ready-to-read credit counter is configured to decrement when the particular producer begins writing a buffer data unit into the corresponding consumer along a data connection. The ready-to-read credit counter is configured to increment when the particular producer receives from the corresponding consumer a read ready token along a control connection. The read ready token indicates to the particular producer that the corresponding consumer has freed a buffer data unit and is ready to receive an additional buffer data unit.

The particular producer stops writing data into the corresponding consumer when the ready-to-read credit counter has zero read credits. The particular producer resumes writing data into the corresponding consumer when the particular producer receives the read ready token from the corresponding consumer.

In some embodiments, the particular producer writes data into two or more corresponding consumers that have respective buffer depths. The respective buffer depths include a minimum buffer depth. The ready-to-read credit counter is initialized with as many read credits as the minimum buffer depth.

In some embodiments, the compiler is further configured to configure each of the producers with a write credit counter that is initialized with one or more write credits. The write credit counter is configured to decrement when the particular producer begins writing the buffer data unit into the corresponding consumer along the data connection. The write credit counter is configured to increment when the particular producer receives from the corresponding consumer a write done token along the control connection. The write done token indicates to the particular producer that the writing of the buffer data unit into the corresponding consumer has completed.

The particular producer stops writing data into the corresponding consumer when the write credit counter has zero write credits. The particular producer resumes writing data into the corresponding consumer when the particular producer receives the write done token from the corresponding consumer.

In one embodiment, a particular stage has two or more consumers and a set of producers. In such an embodiment, the compiler is further configured to create barrier connections that extend from the two or more of the consumers to the producers in the set of producers. The barrier connections control transmission of the read ready token and the write done token from the two or more of the consumers to the producers in the set of the producers.

In one embodiment, the loop at the second level is implemented with multiple parallel pipelines. In such an embodiment, the compiler is further configured to insert the stage buffers and create the control connections between the stage buffers respectively for each pipeline in the multiple parallel pipelines.

In one embodiment, the loop at the second level is a sequential loop. In such an embodiment, the compiler is further configured to configure the stage buffers inserted inside the loop at the second level with a buffer depth of one, and to extend the control connections inside the loop at the second level only from the consumers that are at an egress point of the loop at the second level to the producers that are at an ingress point of the loop at the second level.

Each of the asynchronous stages includes a subset of the compute nodes.

The compiler is further configured to map each of the stage buffers to one or more pattern memory units (PMUs) of a reconfigurable processor. The compiler is further configured to map each of the compute nodes to one or more pattern compute units (PCUs) of the reconfigurable processor. The compiler is further configured to implement the control connections between the PMUs and the PCUs on a control network of the reconfigurable processor. The compiler is further configured to implement the data connections between the PMUs and the PCUs on a data network of the reconfigurable processor. The data network includes a vector sub-network for transmission of vector data, and a scalar sub-network for transmission of scalar data.

A processing system (e.g., CPU, GPU, ASIC, FPGA, CGRA) is described that comprises an array of processing units and a bus system. Processing units in the array are configured to execute a dataflow graph with compute nodes and memory nodes. The memory nodes include upstream memory nodes that provide input to the compute nodes, and downstream memory nodes that receive output from the compute nodes.

The bus system interconnects the processing units. The bus system includes a data bus and a control bus.

Each of the processing units is configured with a ready-to-read credit counter. The ready-to-read credit counter of a first processing unit configurable to implement a particular upstream memory node is initialized with as many read credits as a buffer depth of a second processing unit configurable to implement a corresponding downstream memory node that receives data from the particular upstream memory node. The ready-to-read credit counter is configured to decrement when the first processing unit begins writing a buffer data unit into the second processing unit along a data line on the data bus. The ready-to-read credit counter is configured to increment when the first processing unit receives from the second processing unit a read ready token along a control line on the control bus. The ready-to-read credit counter contains a count of the number of unoccupied buffer units in the downstream data buffer/memory node/processing unit.

In some embodiments, each of the processing units is configured with a write credit counter. The write credit counter is initialized with one or more write credits. The write credit counter of the first processing unit is configured to decrement when the first processing unit begins writing the buffer data unit into the second processing unit along the data line. The write credit counter is configured to increment when the first processing unit receives from the second processing unit a write done token along the control line, signifying that a complete buffer data unit has been transferred to the downstream data buffer/memory node/processing unit.

The processing units in the array comprise configurable units configurable by configuration data to execute the dataflow graph. The control bus comprises a configurable interconnect configurable by configuration data to connect lines on the control bus carrying the read ready token and the write done token to the first processing unit.

The read ready token indicates to the first processing unit that the second processing unit has freed a buffer data unit and is ready to receive an additional buffer data unit. The write done token indicates to the first processing unit that the writing of the buffer data unit into the second processing unit has completed.

A system is described that comprises memory and a compiler. The memory stores a dataflow graph with compute nodes and memory nodes. The memory nodes include upstream memory nodes that provide input to the compute nodes, and downstream memory nodes that receive output from the compute nodes.

The compiler has access to the memory and is configured to configure each of the memory nodes with a ready-to-read credit counter. The ready-to-read credit counter of a particular upstream memory node is initialized with as many read credits as a buffer depth of a corresponding downstream memory node that reads data from the particular upstream memory node. The ready-to-read credit counter is configured to decrement when the particular upstream memory node begins writing a buffer data unit into the corresponding downstream memory node along a data line on the data bus. The ready-to-read credit counter is configured to increment when the particular upstream memory node receives from the corresponding downstream memory node a read ready token along a control line on the control bus.

In some embodiments, the compiler is configured to configure each of the memory nodes with a write credit counter. The write credit counter is initialized with one or more write credits. The write credit counter of the particular upstream memory node is configured to decrement when the particular upstream memory node begins writing the buffer data unit into the corresponding downstream memory node along the data line. The write credit counter is configured to increment when the particular upstream memory node receives from the corresponding downstream memory node a write done token along the control line.

The read ready token indicates to the first processing unit that the second processing unit has freed a buffer data unit and is ready to receive an additional buffer data unit. The write done token indicates to the first processing unit that the writing of the buffer data unit into the second processing unit has completed.

A configurable processor is described that comprises an array of configurable units and a bus system. In some embodiments, a configurable processor or a reconfigurable processor can be a CGRA. In other embodiments, a configurable processor or a reconfigurable processor can be an FPGA.

Configurable units in the array are configured to execute a dataflow graph with compute nodes and memory nodes. The memory nodes include upstream memory nodes that provide input to the compute nodes, and downstream memory nodes that receive output from the compute nodes.

The bus system interconnects the configurable units. The bus system includes a data bus and a control bus.

Each of the configurable units is configured with a ready-to-read credit counter. The ready-to-read credit counter of a first processing unit configurable to implement a particular upstream memory node is initialized with as many read credits as a buffer depth of a second processing unit configurable to implement a corresponding downstream memory node that reads data from the particular upstream memory node. The ready-to-read credit counter is configured to decrement when the first processing unit begins writing a buffer data unit into the second processing unit along a data line on the data bus. The ready-to-read credit counter is configured to increment when the first processing unit receives from the second processing unit a read ready token along a control line on the control bus.

In some embodiments, each of the configurable units is configured with a write credit counter. The write credit counter is initialized with one or more write credits. The write credit counter of the first processing unit is configured to decrement when the particular producer begins writing the buffer data unit into the corresponding consumer along the data line. The write credit counter is configured to increment when the first processing unit receives from the second processing unit a write done token along the control line.

The read ready token indicates to the first processing unit that the second processing unit has freed a buffer data unit and is ready to receive an additional buffer data unit. The write done token indicates to the first processing unit that the writing of the buffer data unit into the second processing unit has completed.

A computer-implemented method is described that includes accessing a dataflow graph with compute nodes that asynchronously transmit data along data connections. The dataflow graph includes a loop nest in which loops are arranged in a hierarchy of levels, such that a loop at a second level is within a loop at a first level. The method includes (i) partitioning execution of the dataflow graph into two or more asynchronous stages by inserting stage buffers inside the loop at the second level and at input/output boundaries between the loop at the first level and the loop at the second level, (ii) classifying the stage buffers as producers and consumers on a stage-by-stage basis by classifying those stage buffers that provide input data to a particular stage as the producers, and classifying those stage buffers that store output data from the particular stage as the consumers, (iii) creating control connections between the stage buffers by extending the control connections from the consumers in the particular stage to the producers in the particular stage, and (iv) controlling data transmission between the compute nodes along the data connections by using the control connections to control writing of the data by the producers into the consumers.

The method further includes (i) configuring each of the producers with a ready-to-read credit counter, (ii) initializing the ready-to-read credit counter of a particular producer with as many read credits as a buffer depth of a corresponding consumer that reads data from the particular producer, (iii) decrementing the ready-to-read credit counter when the particular producer begins writing a buffer data unit into the corresponding consumer along a data connection, and (iv) incrementing the ready-to-read credit counter when the particular producer receives from the corresponding consumer a read ready token along a control connection. The read ready token indicates to the particular producer that the corresponding consumer has freed a buffer data unit and is ready to receive an additional buffer data unit.

In some embodiments, the method further includes (i) configuring each of the producers with a write credit counter, (ii) initializing the write credit counter with one or more write credits, (iii) decrementing the write credit counter when the particular producer begins writing the buffer data unit into the corresponding consumer along the data connection, and (iv) incrementing the write credit counter when the particular producer receives from the corresponding consumer a write done token along the control connection. The write done token indicates to the particular producer that the writing of the buffer data unit into the corresponding consumer has completed.

A computer-implemented method is described that includes accessing a dataflow graph with compute nodes and memory nodes. The memory nodes include upstream memory nodes that provide input to the compute nodes, and downstream memory nodes that receive output from the compute nodes.

The method includes configuring each of the memory nodes with a ready-to-read credit counter, initializing the ready-to-read credit counter of a particular upstream memory node with as many read credits as a buffer depth of a corresponding downstream memory node that reads data from the particular upstream memory node, decrementing the ready-to-read credit counter when the particular upstream memory node begins writing a buffer data unit into the corresponding downstream memory node along a data line on the data bus, and incrementing the ready-to-read credit counter when the particular upstream memory node receives from the corresponding downstream memory node a read ready token along a control line on the control bus.

In some embodiments, the method includes configuring each of the memory nodes with a write credit counter, initializing the write credit counter with one or more write credits, decrementing the write credit counter of the particular upstream memory node when the particular upstream memory node begins writing the buffer data unit into the corresponding downstream memory node along the data line, and incrementing the write credit counter when the particular upstream memory node receives from the corresponding downstream memory node a write done token along the control line.

The read ready token indicates to the first processing unit that the second processing unit has freed a buffer data unit and is ready to receive an additional buffer data unit. The write done token indicates to the first processing unit that the writing of the buffer data unit into the second processing unit has completed.

Other aspects and advantages of the present invention can be seen on review of the drawings, the detailed description and the claims, which follow.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The color drawings also may be available in PAIR via the Supplemental Content tab.

In the drawings, like reference characters generally refer to like parts throughout the different views. Also, the drawings are not necessarily to scale, with an emphasis instead generally being placed upon illustrating the principles of the technology disclosed. In the following description, various embodiments of the technology disclosed are described with reference to the following drawings, in which.

FIG. 7 is one embodiment of the compiler classifying the stage buffers inserted in FIG. 5 as producers and consumers on a stage-by-stage basis.

DETAILED DESCRIPTION

The following description will typically be with reference to specific structural embodiments and methods. It is to be understood that there is no intention to limit the technology to the specifically disclosed embodiments and methods but that the technology may be practiced using other features, elements, methods and embodiments. Preferred embodiments are described to illustrate the present technology, not to limit its scope, which is defined by the claims. Those of ordinary skill in the art will recognize a variety of equivalent variations on the description that follows.

Figure 1:
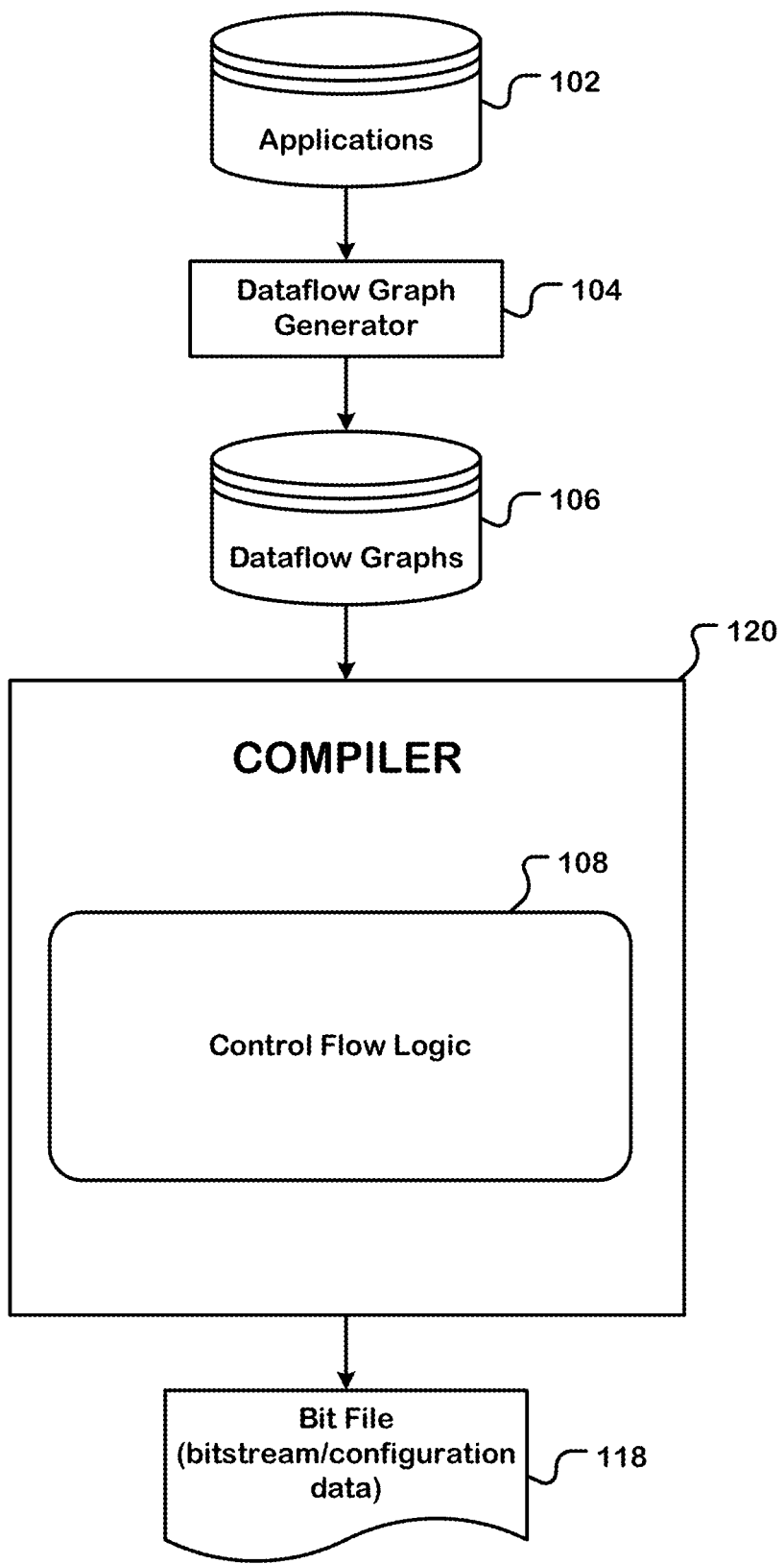
FIG. 1 is a system diagram illustrating a system including dataflow graphs and a compiler that generates an anti-congestion flow control for the dataflow graphs.

FIG. 1 is a system diagram illustrating a system including dataflow graphs and a compiler that generates an anti-congestion flow control for the dataflow graphs.

Coarse-grained reconfigurable architectures (CGRAs) comprise distributed compute and memory components in a programmable interconnect fabric. Applications 102 are executed on CGRAs in a distributed fashion by programming the individual compute and memory components to asynchronously receive, process, and send data and control information. In CGRAs, computation can be executed as deep, nested dataflow pipelines that exploit nested parallelism and data locality very efficiently. These dataflow pipelines contain several stages of computation, where each stage reads data from one or more input buffers with an irregular memory access pattern, performs computations on the data while using one or more internal buffers to store and retrieve intermediate results, and produce outputs that are written to one or more output buffers. The structure of these pipelines depends on the control and dataflow graph representing the application. Pipelines can be arbitrarily nested and looped within each other.

Applications 102 comprise high-level programs that have irregular memory access patterns or data dependent flow control. A high-level program is source code written in programming languages like C, C++, Java, Python, and Spatial. The high-level program can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL. In one example, the high-level program can implement a convolutional neural network with several processing layers, such that each processing layer can include one or more nested loops. The high-level program can execute irregular memory operations that involve accessing inputs and weights and performing matrix multiplications between the inputs and the weights. The high-level program can include nested loops with high iteration count and loop bodies that load and multiply input values from a preceding processing layer with weights of a succeeding processing layer to produce an output for the succeeding processing layer. The high-level program can have loop-level parallelism of the outermost loop body, which can be exploited using coarse-grained pipelining. The high-level program can have instruction-level parallelism of the innermost loop body, which can be exploited using loop unrolling, SIMD vectorization, and pipelining.

Regarding loops in the high-level programs of the applications 102, loops directly nested in a loop body are termed the child loops of the outer parent loop. A loop is called an innermost loop if it does not have any children, i.e., there are no nested loops within its body. A loop is an outermost loop if it does not have a parent, i.e., it is not nested within another loop's body. An imperfectly nested loop has a body with a mix of non-looping statements (e.g., primitive arithmetic, logical, and relational operations) and one or more child loops. Parallelism in the imperfectly nested loops can be exploited at any or all loop levels, and in the operations that comprise loop bodies. Parallelism can occur in multiple forms such as fine-grained and coarse-grained pipeline parallelism, data parallelism, and task parallelism.

A dataflow graph generator 104 generates dataflow graphs 106 of the high-level programs of the applications 102. The dataflow graph generator 104 transforms the input behavioral description of the high-level programs into an intermediate representation such as the dataflow graphs 106. This may include code optimization steps like false data dependency elimination, dead-code elimination, and constant folding. The dataflow graphs 106 can encode the data and control dependencies of the high-level programs.

The dataflow graphs 106 comprise nodes and edges. The nodes can represent compute operations and memory allocations. The edges can represent data flow and flow control. In some embodiments, each loop in the high-level programs can be represented as a "controller" in the dataflow graphs 106. The dataflow graphs 106 support branches, loops, function calls, and other variations of control dependencies. In some embodiments, after the dataflow graphs 106 are generated, additional analyses or optimizations focused on loop transformations can be performed, such as loop unrolling, loop pipelining, loop fission/fusion, and loop tiling.

A compiler 120 partitions the dataflow graphs 106 into memory allocations and execution fragments. Execution fragments represent operations on data. An execution fragment can comprise portions of a program representing an amount of work. An execution fragment can comprise computations encompassed by a set of loops, a set of graph nodes, or some other unit of work that requires synchronization. An execution fragment can comprise a fixed or variable amount of work, as needed by the program. Different ones of the execution fragments can contain different amounts of computation. Execution fragments can represent parallel patterns or portions of parallel patterns and are executable asynchronously.

In some embodiments, the partitioning of the dataflow graphs 106 into the execution fragments includes treating calculations within at least one innermost loop of a nested loop of the dataflow graphs 106 as a separate execution fragment. In other embodiments, the partitioning of the dataflow graphs 106 into the execution fragments includes treating calculations of an outer loop around the innermost loop of the dataflow graphs 106 as a separate execution fragment. In the case of imperfectly nested loops, operations within a loop body up to the beginning of a nested loop within that loop body are grouped together as a separate execution fragment.

Memory allocations represent the creation of logical memory spaces in on-chip and/or off-chip memories for data required to implement the dataflow graphs 106. Memory allocations define the type and the number of hardware resources (functional units, storage, or connectivity components). Main memory (e.g., DRAM) is off-chip memory for which the memory allocations can be made. Scratchpad memory (e.g., SRAM) is on-chip memory for which the memory allocations can be made. Other memory types for which the memory allocations can be made for various access patterns and layouts include read-only lookup-tables (LUTs), fixed size queues (e.g., FIFOs), and register files.

The compiler 120 binds memory allocations to virtual memory units and binds execution fragments to virtual compute units. In some embodiments, the compiler 120 partitions execution fragments into memory fragments and compute fragments. A memory fragment comprises address calculations leading up to a memory access. A compute fragment comprises all other operations in the parent execution fragment. In one embodiment, each execution fragment is broken up into a plurality of memory fragments and exactly one compute fragment. In one embodiment, the compiler 120 performs the partitioning using reverse dataflow analysis such that inputs to an address used in a memory access are recursively flagged until the compiler 120 reaches either constant values or (bound) loop/pattern iterators. A single execution fragment can produce one or more memory fragments, depending on how many memory accesses exist in the original loop body. In cases where the same memory addressing logic is shared across multiple memory accesses, address calculation may be duplicated to create multiple memory fragments from the same execution fragment.

The memory fragments of the execution fragments are configured to index into data structures. At least one of the memory fragments indexes into a data structure in the logical memory spaces of one of the memory allocations. Each compute and memory fragment preserves information about all loops whose loop bodies directly contain the operations in the corresponding execution fragment. In one embodiment, this corresponds to replicating the calculation of the loop iterators of each loop into each compute and memory fragment. This replication allows each fragment to preserve the same iterative behavior as the original program while also allowing distributed calculation of loop iterators.

The compiler 120 assigns the memory fragments to the virtual memory units and assigns the compute fragments to the virtual compute units. Each memory fragment is mapped operation-wise to the virtual memory unit corresponding to the memory being accessed. Each operation is lowered to its corresponding configuration intermediate representation for that virtual memory unit. Each compute fragment is mapped operation-wise to a newly allocated virtual compute unit. Each operation is lowered to its corresponding configuration intermediate representation for that virtual compute unit.

The compiler 120 allocates the virtual memory units to physical memory units of a processor (e.g., pattern memory units (PMUs) of the reconfigurable processor) and allocates the virtual compute units to physical compute units of the processor (e.g., pattern compute units (PCUs) of the reconfigurable processor).

The compiler 120 places the physical memory units and the physical compute units onto positions in an array of the processor (e.g., array of configurable units of the reconfigurable processor) and routes data and control networks between the placed positions. In one embodiment, this includes allocating physical resources such as counters and registers within each physical memory and compute unit.

The compiler 120 generates a bit file 118 with configuration data for the placed positions and the routed data and control networks. In one embodiment, this includes assigning coordinates and communication resources of the physical memory and compute units by placing and routing units onto the array of the processor while maximizing bandwidth and minimizing latency.

The compiler 120 loads the bit file 118 onto an instance of the array of the processor and causes it to implement the dataflow graphs 106. In some embodiments, the dataflow graph generator 104 is part of the compiler 120.

Figure 2:
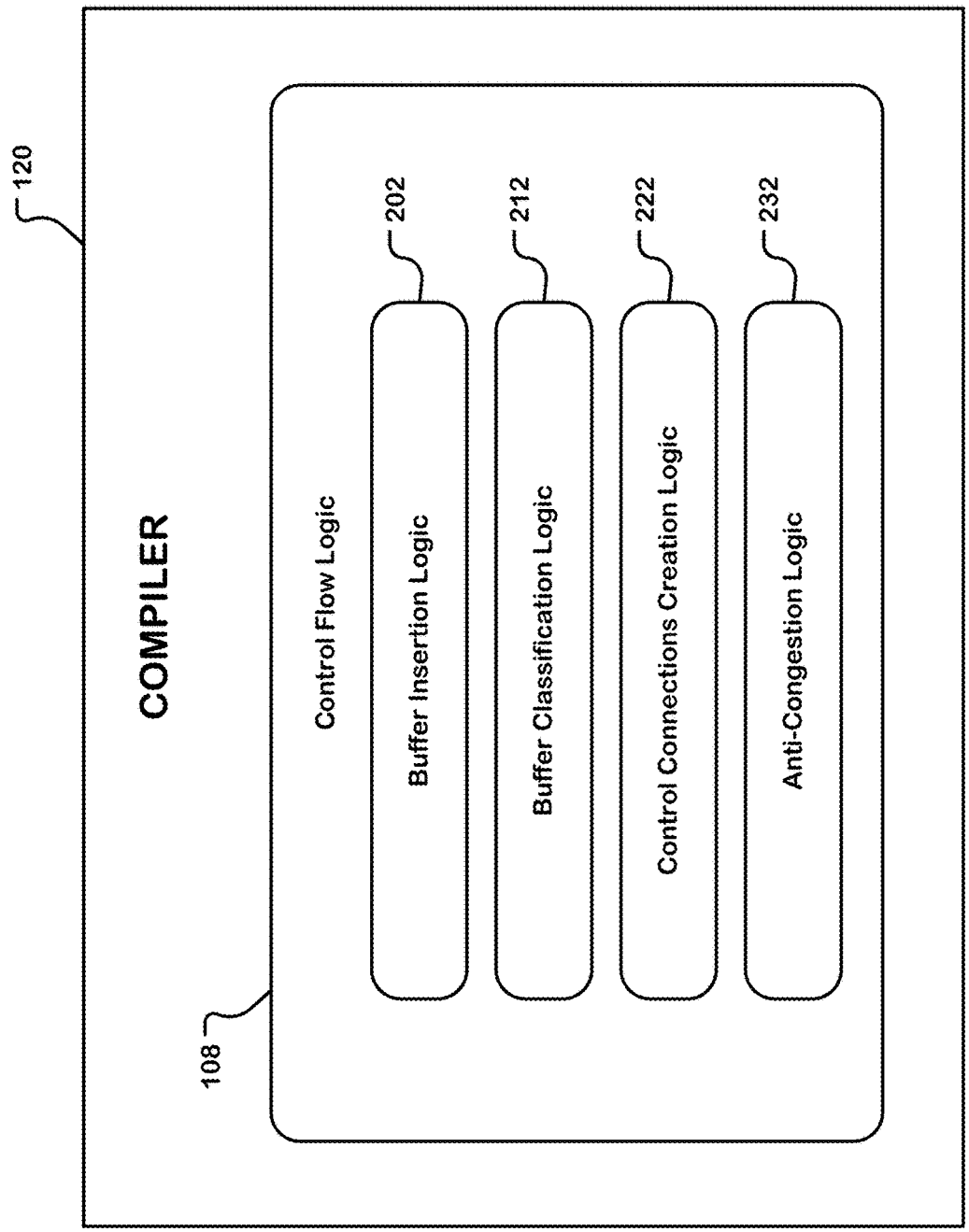
FIG. 2 shows a heuristics diagram of the compiler with its various functional components.

FIG. 2 shows a heuristics diagram of the compiler 120 with its various functional components. The compiler 120 is configured with flow control logic 108. The flow control logic 108 comprises buffer insertion logic 202, buffer classification logic 212, control connections creation logic 222, and anti-congestion logic 232.

The flow control logic 108 is configured to process a dataflow graph and generate flow control data for the dataflow graph using the flow control logic 108. The dataflow graph has compute nodes that asynchronously transmit data along data connections. The dataflow graph includes a loop nest in which loops are arranged in a hierarchy of levels, such that a loop at a second level is within a loop at a first level.

The buffer insertion logic 202 is configured to partition execution of a dataflow graph into two or more asynchronous stages by inserting stage buffers inside the loop at the second level and at input/output boundaries between the loop at the first level and the loop at the second level. Each of the asynchronous stages includes a subset of the compute nodes. The buffer insertion logic 202 is further configured to insert additional stage buffers inside the loop at the second level. The additional stage buffers are configured to interface with the stage buffers inserted at the input/output boundaries between the loop at the first level and the loop at the second level.

The buffer classification logic 212 is configured to classify the stage buffers as producers and consumers on a stage-by-stage basis by classifying those stage buffers that provide input data to a particular stage as the producers, and classifying those stage buffers that store output data from the particular stage as the consumers.

The control connections creation logic 222 is configured to create control connections between the stage buffers by extending the control connections from the consumers in the particular stage to the producers in the particular stage. The control connections extend from a particular consumer to one or more corresponding producers that write data into the particular consumer.

The anti-congestion logic 232 is configured to control data transmission between the compute nodes along the data connections by using the control connections to control writing of the data by the producers into the consumers. The anti-congestion logic 232 is configured to configure each of the producers with a ready-to-read credit counter, such that the ready-to-read credit counter of a particular producer is initialized with as many read credits as a buffer depth of a corresponding consumer that reads data from the particular producer. The ready-to-read credit counter is configured to decrement when the particular producer begins writing a buffer data unit into the corresponding consumer along a data connection. The ready-to-read credit counter is configured to increment when the particular producer receives from the corresponding consumer a read ready token along a control connection. The read ready token indicates to the particular producer that the corresponding consumer has freed a buffer data unit and is ready to receive an additional buffer data unit. The particular producer stops writing data into the corresponding consumer when the ready-to-read credit counter has zero read credits. The particular producer resumes writing data into the corresponding consumer when the particular producer receives the read ready token from the corresponding consumer. In some embodiments, the particular producer writes data into two or more corresponding consumers that have respective buffer depths. The respective buffer depths include a minimum buffer depth. The ready-to-read credit counter is initialized with as many read credits as the minimum buffer depth.

The anti-congestion logic 232 is configured to configure each of the producers with a write credit counter that is initialized with one or more write credits. The write credit counter is configured to decrement when the particular producer begins writing the buffer data unit into the corresponding consumer along the data connection. The write credit counter is configured to increment when the particular producer receives from the corresponding consumer a write done token along the control connection. The write done token indicates to the particular producer that the writing of the buffer data unit into the corresponding consumer has completed. The particular producer stops writing data into the corresponding consumer when the write credit counter has zero write credits. The particular producer resumes writing data into the corresponding consumer when the particular producer receives the write done token from the corresponding consumer.

In one embodiment, a particular stage has two or more consumers and a set of producers. In such an embodiment, the anti-congestion logic 232 is configured to create barrier connections that extend from the two or more of the consumers to the producers in the set of producers. The barrier connections control transmission of the read ready token and the write done token from the two or more of the consumers to the producers in the set of the producers.

In one embodiment, the loop at the second level is implemented with multiple parallel pipelines. In such an embodiment, the anti-congestion logic 232 is configured to insert the stage buffers and create the control connections between the stage buffers respectively for each pipeline in the multiple parallel pipelines.

In one embodiment, the loop at the second level is a sequential loop. In such an embodiment, the anti-congestion logic 232 is further configured to configure the stage buffers inserted inside the loop at the second level with a buffer depth of one, and to extend the control connections inside the loop at the second level only from the consumers that are at an egress point of the loop at the second level to the producers that are at an ingress point of the loop at the second level.

The compiler 120 is configured to map each of the stage buffers to one or more pattern memory units (PMUs) of a reconfigurable processor. The compiler 120 is configured to map each of the compute nodes to one or more pattern compute units (PCUs) of the reconfigurable processor. The compiler 120 is configured to implement the control connections between the PMUs and the PCUs on a control network of the reconfigurable processor. The compiler 120 is configured to implement the data connections between the PMUs and the PCUs on a data network of the reconfigurable processor. The data network includes a vector sub-network for transmission of vector data, and a scalar sub-network for transmission of scalar data.

Figure 3:
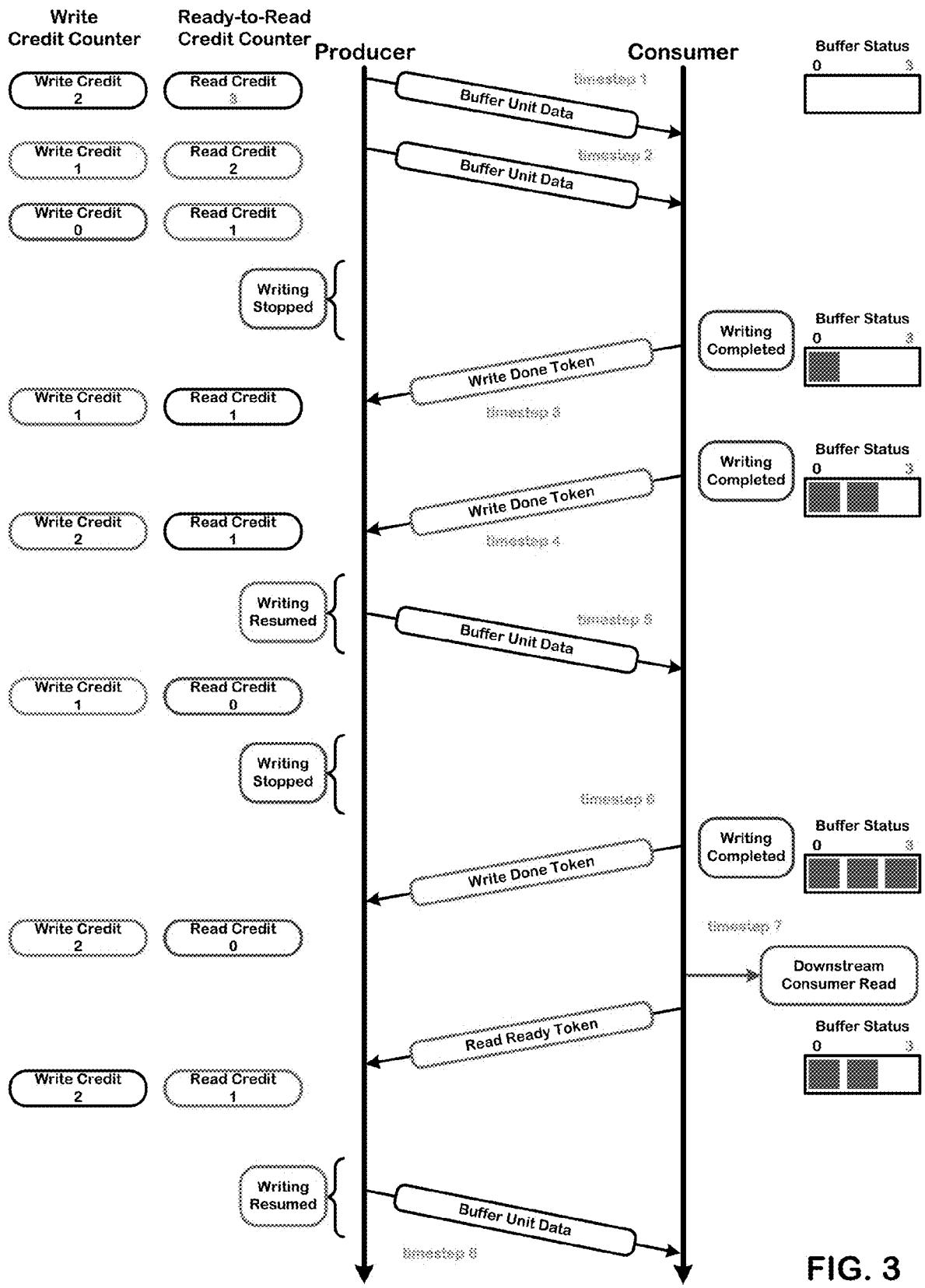
FIG. 3 shows one embodiment of the anti-congestion flow control implemented between a particular producer and a corresponding consumer.

FIG. 3 shows one embodiment of the anti-congestion flow control implemented between a particular producer and a corresponding consumer. A data processing pipeline/operation comprises at least a producer, a compute node, and a consumer. The producer provides an input (e.g., vector, tensor) to the compute node. The compute node processes the input and generates an output (e.g., a weighted sum produced by a dot product operation). The compute node provides the output to the consumer. FIG. 3 omits the compute node to improve clarity.

One skilled in the art will appreciate that the data processing pipeline can comprise a plurality of producers, a plurality of compute nodes, and a plurality of consumers, such that a compute node can receive input from multiple producers and can provide output to multiple consumers. In the context of this application, when it is stated that a particular producer writes data into a corresponding consumer, it is to be understood that the particular producer provides data to a compute node, which in turn processes the data, generates an alternative representation of the data, and writes the alternative representation of the data into the corresponding consumer. In one example, the alternative representation can be the result of a general matrix multiply (GeMM) operation.

In the context of this application, a producer can be referred to as an upstream buffer or upstream memory node/unit, a compute node can be referred to as an intermediate computing node/unit or intermediate processing node/unit, and a consumer can be referred to as a downstream buffer or downstream memory node/unit. Additionally, the producers, the compute nodes, and the consumers operate asynchronously and therefore use the anti-congestion flow control described herein to handle backpressure and avoid processing bottlenecks and buffer overflows between the producers and the consumers.

Turning to the example illustrated in FIG. 3, a particular processor writes data into a corresponding consumer, i.e., the corresponding consumer reads data from the particular processor. The processor has a buffer depth of p (e.g., 2, 3, 4, 8, 12, etc.) and the consumer has a buffer depth of c (e.g., 2, 3, 4, 8, 12, etc.), where p can be equal to c or can be different from c. In FIG. 3, c is three (in magenta). FIG. 3 shows the buffer status of the consumer at various processing timesteps.

The producer is configured with a ready-to-read credit counter and a write credit counter. The ready-to-read credit counter is initialized with as many read credits as the buffer depth of the consumer. In FIG. 3, the ready-to-read credit counter is initialized with three read credits because the buffer depth of the consumer is three (in magenta). The write credit counter is initialized with one or more write credits (e.g., two write credits in FIG. 3). In data processing pipelines with multiple consumers, the ready-to-read credit counter in the producer is initialized with the minimum of the allowable buffer depth among all the consumers. Similarly, the write credit counter in the producer is initialized with the minimum of allowable write credits among all the consumers.

In FIG. 3, a decrement in the ready-to-read credit counter is indicated by a blue outline and a decrement in the write credit counter is indicated by an orange outline. In FIG. 3, expiration of the ready-to-read credit counter, i.e., zero read credits is indicated by a red outline and expiration of the write credit counter, i.e., zero write credits is also indicated by a red outline. In FIG. 3, an increment in the ready-to-read credit counter is indicated by a green outline and an increment in the write credit counter is also indicated by a green outline.

The ready-to-read credit counter is configured to decrement when the producer begins writing a buffer data unit into the consumer. The size of the buffer data unit is s (e.g., 16 bytes, 64 bytes, 512 bytes). The write credit counter is configured to decrement when the producer begins writing the buffer data unit into the consumer. The ready-to-read credit counter is configured to increment when the producer receives from the consumer a read ready token. The read ready token indicates to the producer that the consumer has freed a buffer data unit and is ready to receive an additional buffer data unit. The producer stops writing data into the consumer when the ready-to-read credit counter has zero read credits. The producer resumes writing data into the consumer when the producer receives the read ready token from the consumer. The write credit counter is configured to increment when the producer receives from the consumer a write done token. The write done token indicates to the producer that the writing of the buffer data unit into the consumer has completed. The producer stops writing data into the consumer when the write credit counter has zero write credits. The producer resumes writing data into the consumer when the producer receives the write done token from the consumer. Accordingly, when either the ready-to-read credit counter expires or the write credit counter expires, the producer stops writing data into the consumer. The read ready tokens and the write done tokens are pulse signals that emanate from the consumer and terminate at the producer.

As discussed above, the ready-to-read credit counter is initialized with three read credits and the write credit counter is initialized with two write credits. This means that the producer will keep sending data to the consumer as along as the read credit is greater than zero. The ready-to-read credit counter decrements one read credit per sample. The producer stops sending data to the consumer when the read credit is zero. In FIG. 3, zero read credit means that the producer has sent three samples to the consumer, but the consumer has not pushed any of them out yet to a downstream consumer and therefore the consumer currently does not have space to receive another sample from the producer.

At a first timestep, the producer begins writing a first buffer unit data into the consumer. In response, the ready-to-read credit counter is decremented by one (read credit=2) and the write credit counter is also decremented by one (write credit=1).

At a second timestep, the producer begins writing a second buffer unit data into the consumer. In response, the ready-to-read credit counter is further decremented by one (read credit=1) and the write credit counter is further decremented by one (write credit=0). The write credit counter expires and therefore the producer stops writing data into the consumer (writing stopped).

At a third timestep, the writing of the first buffer unit data into the consumer is complete. In response, the consumer sends a first write done token to the producer. In response, the write credit counter is incremented by one and therefore reactivated (write credit=1). In some embodiments, the producer may begin writing another buffer unit to the consumer, since both the read and write credit counters are greater than 0.

At a fourth timestep, the writing of the second buffer unit data into the consumer is complete. In response, the consumer sends a second write done token to the producer. In response, the write credit counter is further incremented by one (write credit=2).

The write done token ensures that at most K samples are processed through the compute node(s) between the producer and the consumer without receiving an acknowledgement from the consumer, where K is the initialization value of the write credit counter. These samples can be considered "in-flight" to the consumer. K must be greater than 0 and should be less than or equal to the read credit counter initialization value. The producer stops sending data to the consumer when the write credit is zero. A zero write credit means that the consumer is still collecting the result from a previous sample and the processing of the previous sample is not yet finished. The producer sends the next sample to the consumer only when the consumer finishes writing the result of the previous sample to a downstream consumer and is ready to start processing the next sample. In some embodiments, the write credit counter is initialized with only one write credit to ensure that there is only one sample being processed at a given timestep.

At this point, since both the ready-to-read credit counter and the write credit counter are active (unexpired), the producer resumes writing data into the consumer at a fifth timestep (writing resumed). Note that, in a different sequence, the producer may have started writing data to the consumer after timestep three, since the write credit counter is non-zero.

At the fifth timestep, the producer begins writing a third buffer unit data into the consumer. In response, the ready-to-read credit counter is further decremented by one (read credit=0) and the write credit counter is decremented by one (write credit=1). The ready-to-read credit counter expires and therefore the producer stops writing data into the consumer (writing stopped).

At a sixth timestep, the writing of the third buffer unit data into the consumer is complete. In response, the consumer sends a third write done token to the producer. In response, the write credit counter is incremented by one (write credit=2).

At a seventh timestep, a downstream consumer reads a buffer unit data from the consumer, i.e., the consumer is an upstream producer from the perspective of the downstream consumer and writes the buffer unit data into the downstream consumer. This frees up space in the consumer equaling to a buffer unit data and therefore the consumer is ready to receive an additional buffer unit data from the producer. In response, the consumer sends a read ready token to the producer. In response, the ready-to-read credit counter is incremented by one and therefore reactivated (read credit=1).

The consumer sends the read ready token to the producer when the consumer is ready to receive a new sample. In some embodiments, the ready-to-read credit counter is initialized with at least two read credits so that the consumer can hold at least two samples at the same timestep: the first read credit for writing the result of a current sample S which is being produced at a current timestep and the second read credit for a next sample S+1 which is going to be consumed at the next timestep.

In one embodiment, the ready-to-read credit counter is initialized with three or more read credits for skip connections when the consumer needs to hold more samples to balance the skip of compute stages. That is, there is a further downstream consumer that reads the sample from the consumer several timesteps later. Accordingly, the buffer size of the consumer is increased to hold more previous samples, enabling the consumer to supply the older samples while still receiving new samples.

At this point, since both the ready-to-read credit counter and the write credit counter are active (unexpired), the producer resumes writing data into the consumer at an eighth timestep (writing resumed).

Therefore, at the producer, if write credit=0 or read credit=0, the producer stops sending data out to the consumer. The consumer can be considered a buffer that is served like a pipeline staging register. The compute between the producer and the consumer is very fast, such that the consumer keeps writing processed data to its entry for downstream processing by downstream consumers. The producer keeps pushing new samples out to the consumer as along as the producer has at least one write credit. Read credits are released as buffered entries in the consumer are consumed. If the processing speed between the consumer and its downstream consumers is relatively fast, read credits may be released such that the read credit counter in the producer never expires. Otherwise, if the processing speed between the consumer and its downstream consumers is relatively slow, the producer keeps pushing data until the consumer is full, and then the producer waits for the consumer to become available again.

Figure 4:
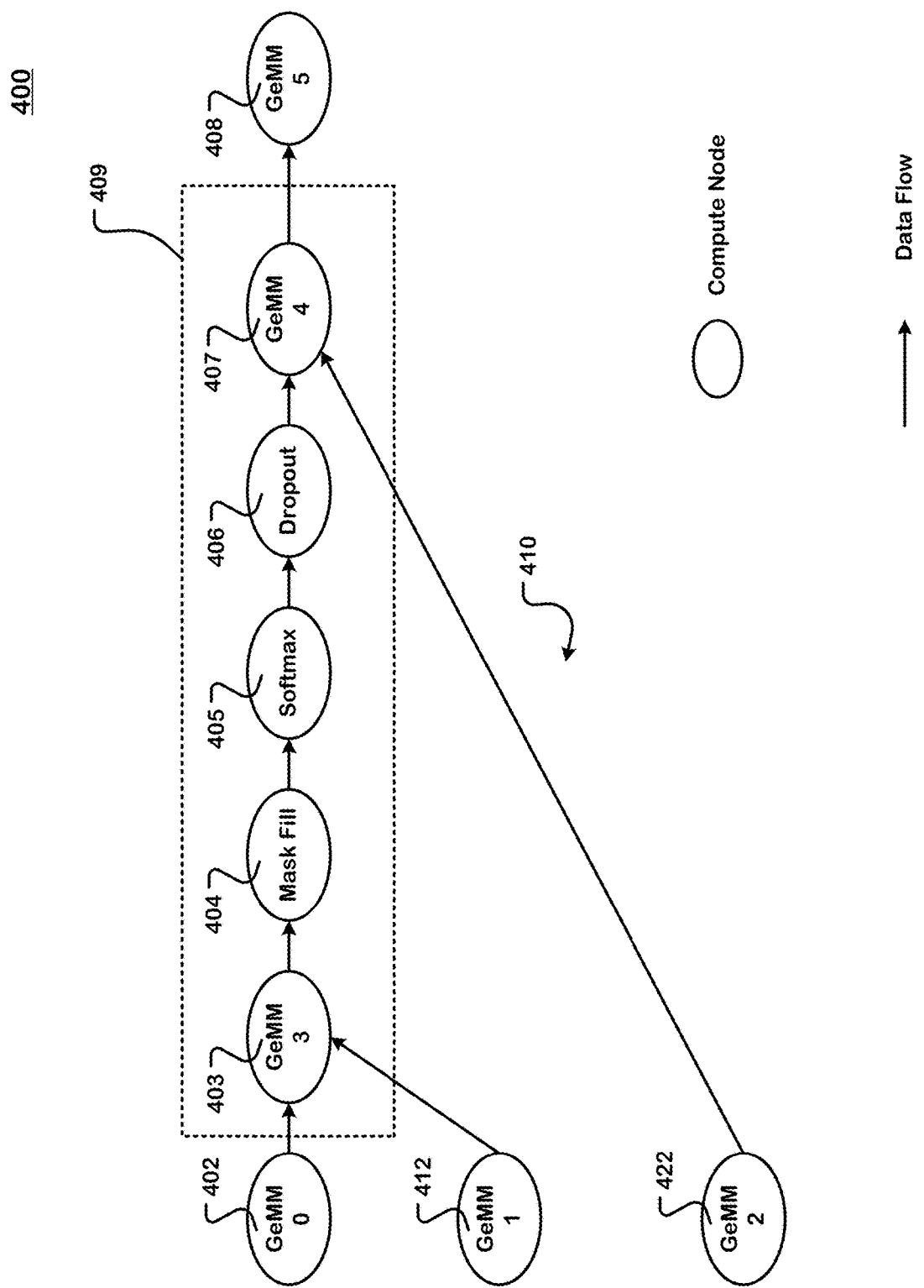
FIG. 4 is an example of a dataflow graph with compute nodes that asynchronously transmit data along data connections.

FIG. 4 is an example of a dataflow graph 400 with compute nodes that asynchronously transmit data along data connections. The dataflow graph 400 represents the so-called multi-head attention module of the Transformer model. The dataflow graph 400 includes a loop nest in which loops are arranged in a hierarchy of levels, such that a loop at a second level 409 is within a loop at a first level 410. The loop at the first level 410 includes four matrix multiplication nodes 402, 412, 422, 408, and can be considered the outer loop 410. The loop at the second level 409 includes an ingress matrix multiplication node 403, a mask fill node 404, a softmax node 405, a dropout node 406, and an egress matrix multiplication node 407, and can be considered the innermost loop 409.

In the outer loop 410, each of the first three matrix multiplication nodes 402, 412, 422 receives a respective input (e.g., a respective tensor), executes a general matrix multiply (GeMM) operation on the respective input using a respective set of weights, and produces a respective output. The outputs from the first three matrix multiplication nodes 402, 412, 422 are piecewise processed by the innermost loop 409 over multiple iterations, and each of the multiple iterations can be parallelized by parallelizing multiple instances of the innermost loop 409. This is a first data transfer point/boundary between the outer loop 410 and the innermost loop 409 at which data is transmitted from the outer loop 410 to the innermost loop 409.

The outputs from the multiple iterations are combined (e.g., concatenated) to generate an input for the matrix multiplication node 408 of the outer loop 410. This is a second data transfer point/boundary between the innermost loop 409 and the outer loop 410 at which data is transmitted from the innermost loop 409 to the outer loop 410.

Figure 5:
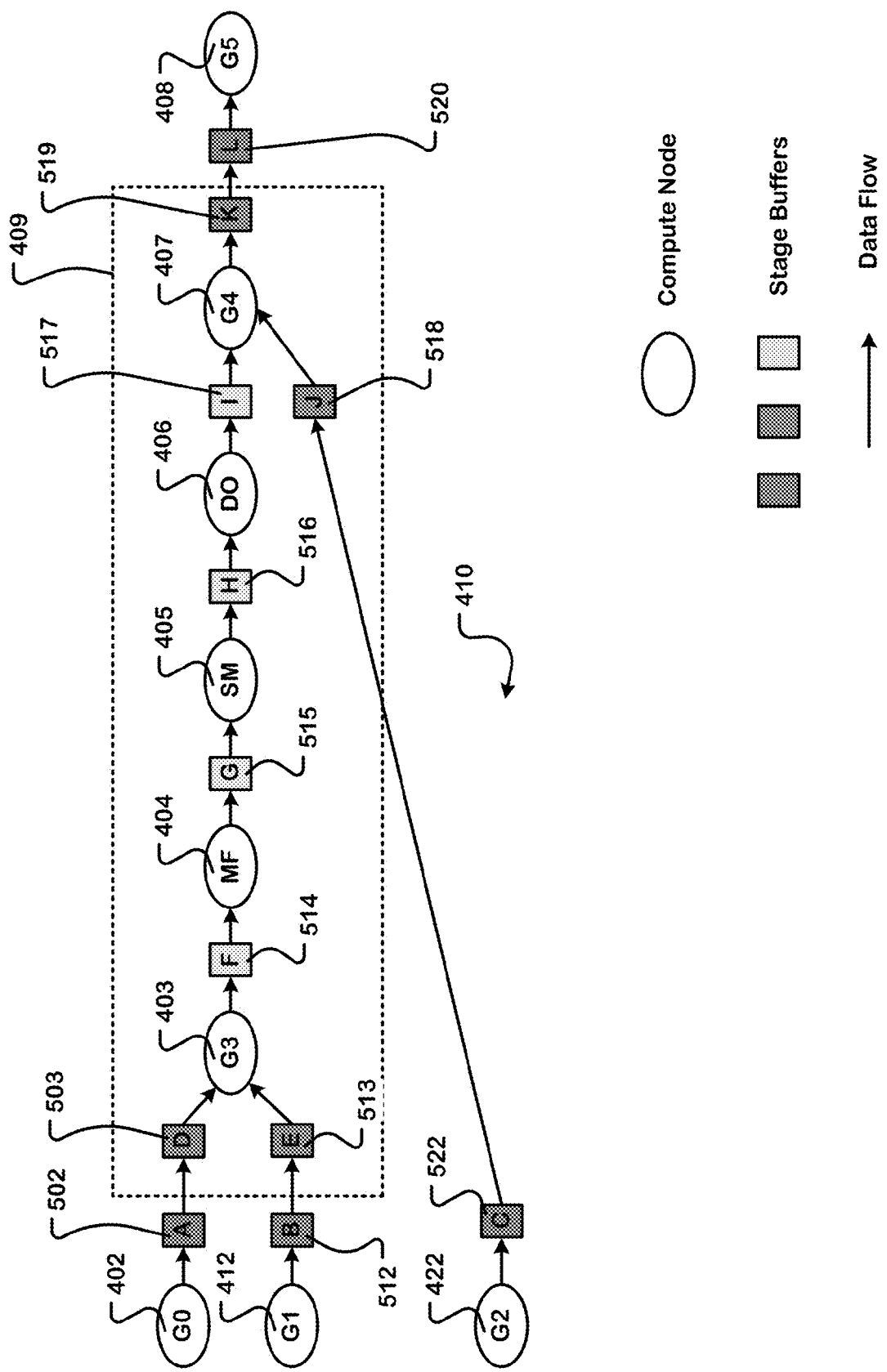
FIG. 5 is one embodiment of the compiler inserting stage buffers in the dataflow graph of FIG. 4.

FIG. 5 is one embodiment of the compiler 120 inserting stage buffers in the dataflow graph 400. The compiler 120 can insert three types of stage buffers: (1) inter-stage buffers, (2) intra-stage buffers, and (3) interface buffers based on the cost model of the compute nodes of the dataflow graph 400.

The inter-stage buffers are inserted at input/output boundaries between the loop at the first level 410 and the loop at the second level 409 (i.e., between compute nodes at the data transfer points/boundaries between the outer loop 410 and the innermost loop 409). The intra-stage buffers are inserted inside the loop at the second level 409 (e.g., between compute nodes inside the innermost loop 409). The interface buffers are also inserted inside the innermost loop 409 to interface with the inter-stage buffers for layout and access pattern transformations. The interface buffers are used because the granularity of communication (i.e., the size of the tensor/data produced/consumed) varies between loops at different levels.

In the example illustrated in FIG. 5, the inter-stage buffers are depicted in blue and include stage buffers 502, 512, 522, 520. The intra-stage buffers are depicted in yellow and include stage buffers 514, 515, 516, 517. The interface buffers are depicted in orange and include stage buffers 503, 513, 518, 519.

Figure 6:
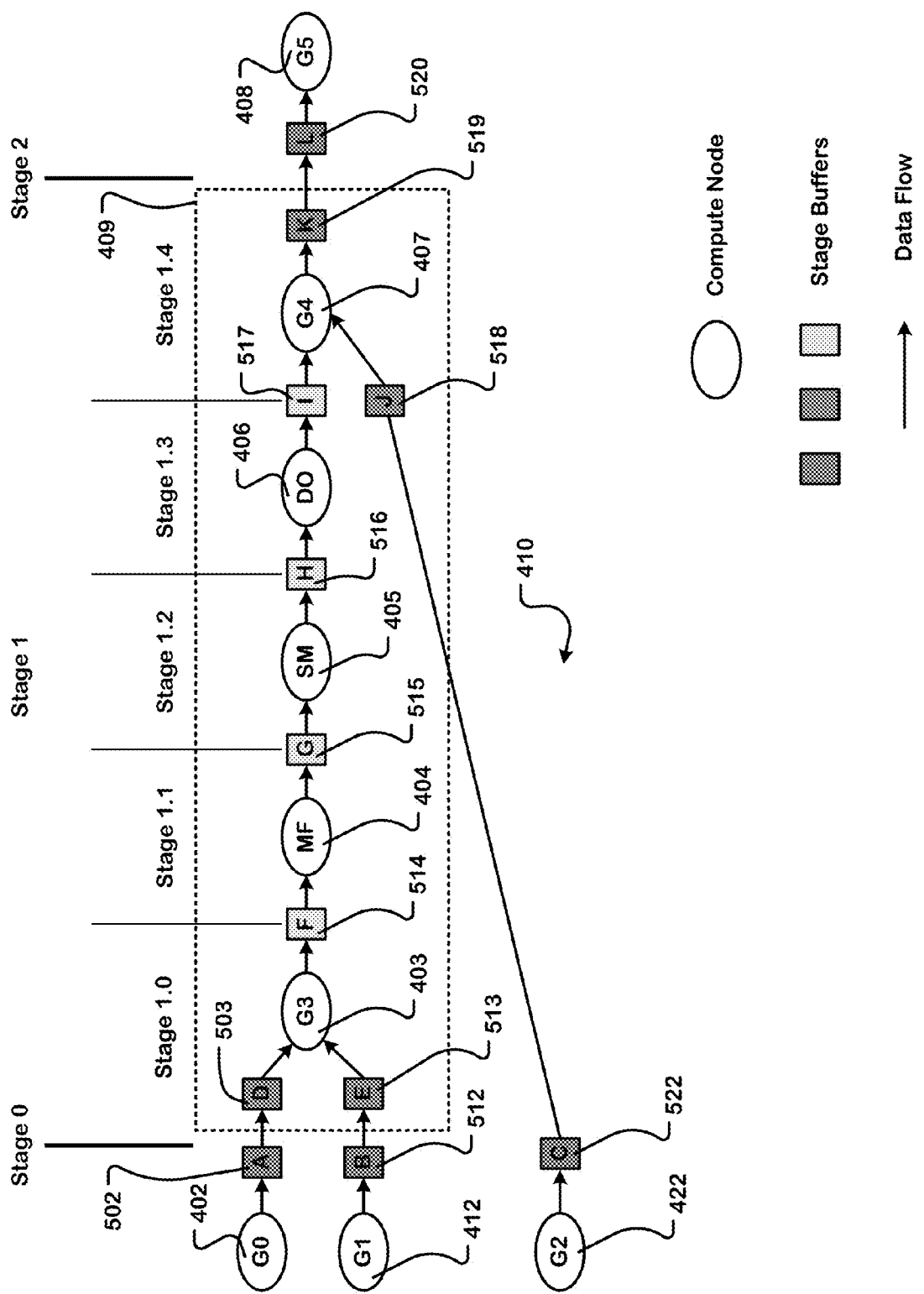
FIG. 6 is one embodiment of the compiler partitioning execution of the dataflow graph of FIG. 4 into a plurality of asynchronous stages as a result of inserting the stage buffers in FIG. 5.

FIG. 6 is one embodiment of the compiler 120 partitioning execution of the dataflow graph 400 into a plurality of asynchronous stages as a result of inserting the stage buffers in FIG. 5. In the example shown in FIG. 6, the compiler 120 partitions execution of the dataflow graph 400 into at least three stages: stage 0, stage 1, and stage 2. Execution of stage 1 is further partitioned into five stages: stage 1.0, stage 1.1., stage 1.2, stage 1.3, and stage 1.4.

FIG. 7 is one embodiment of the compiler 120 classifying the stage buffers inserted in FIG. 5 as producers and consumers on a stage-by-stage basis by classifying those stage buffers that provide input data to a particular stage as the producers, and classifying those stage buffers that store output data from the particular stage as the consumers. In FIG. 7, note that the classification changes from stage-to-stage, such that a particular stage buffer can be a consumer in a given stage and a producer in another stage. For example, stage buffers A, B, C (502, 512, 522) are consumers in stage 0 and producers in stage 1. Similarly, stage buffer G (515) is a consumer in stage 1.1. and a producer in stage 1.2.

Figure 8A:
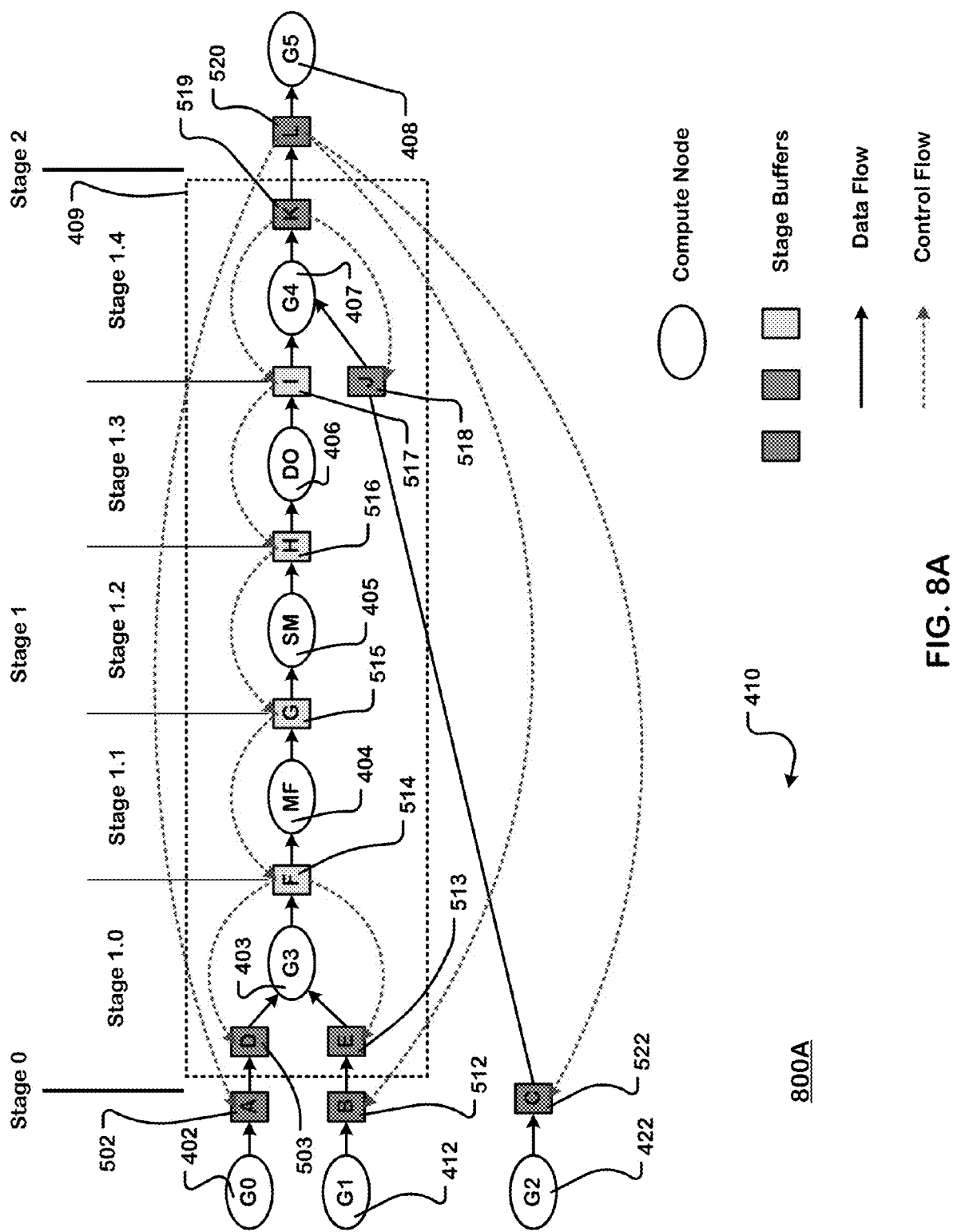
FIG. 8A is one embodiment of the compiler creating control connections between the stage buffers inserted in FIG. 5 on a stage-by-stage basis.

FIG. 8A is one embodiment of the compiler 120 creating control connections (dotted red arrows) between the stage buffers inserted in FIG. 5 on a stage-by-stage basis by extending the control connections from the consumers in a particular stage to the producers in the particular stage. The control connections extend from a particular consumer to one or more corresponding producers that write data into the particular consumer. For example, for stage 1, the producers are stage buffers A, B, C (502, 512, 522) and the consumer is stage buffer L (520), and therefore three control connections extend from the stage buffer L (520) to the stage buffers A, B, C (502, 512, 522), respectively. Similarly, for stage 1.0, the producers are stage buffers D, E (503, 513), and the consumer is stage buffer F (514), and therefore two control connections extend from the stage buffer F (514) to the stage buffers D and E (503, 513), respectively.

The compiler 120 controls data transmission between the compute nodes of the dataflow graph 400 along the data connections by using the control connections to control writing of the data by the producers into the consumers. A detailed description of how the anti-congestion logic 232 of the compiler 120 controls writing of the data by the producer stage buffers into the consumer stage buffers using a ready-to-read credit counter and a write credit counter is provided above with respect to FIG. 3. That is, the control connections couple stage buffers as producers and consumers on a stage-by-stage basis and present them as such to the anti-congestion logic 232. The anti-congestion logic 232 then configures each of the stage buffers with the ready-to-read credit counter and the write credit counter and operates them accordingly depending on whether a particular stage buffer is serving as a producer stage buffer or a consumer stage buffer at a given processing timestep/processing stage.

In some embodiments, a particular stage has two or more consumer stage buffers and a set of producer stage buffers (e.g., stage 0 with three consumer stage buffers A, B, C (502, 512, 522). In such embodiments, the compiler 120 creates barrier connections that extend from the two or more of the consumers to the producers in the set of producers. The barrier connections control transmission of the read ready token and the write done token from the two or more of the consumers to the producers in the set of the producers. After the control connections are established in the dataflow graph 400, it becomes a control and dataflow graph 800A.

In some embodiments, the loop at the second level 409 is implemented with multiple parallel pipelines. In such embodiments, the compiler 120 inserts the stage buffers and create the control connections between the stage buffers respectively for each pipeline in the multiple parallel pipelines.

Figure 8B:
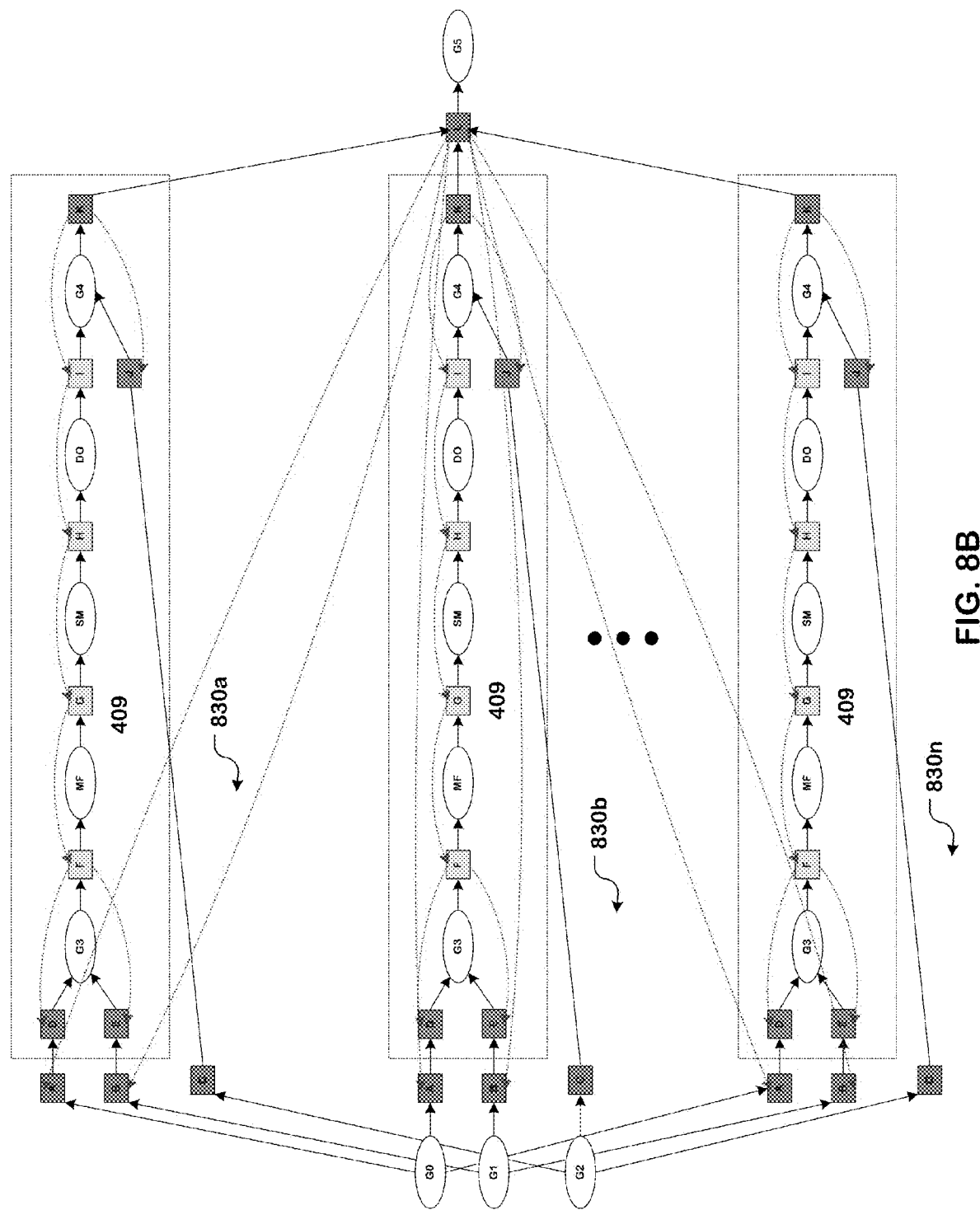
FIG. 8B is one embodiment of the compiler inserting stage buffers and creating control connections for a plurality of loops executing in parallel as separate processing pipelines.

FIG. 8B is one embodiment of the compiler 120 inserting stage buffers and creating control connections for a plurality of loops executing in parallel as separate processing pipelines. In the example illustrated in FIG. 8B, multiple instances of the innermost loop 409 are initialized and executed in parallel to process input tensors across a plurality of processing pipelines 830a, 830b, ... 830n (e.g., numerous multi-headed self-attention encoder modules of the Transformer model). In such embodiments, the compiler 120 inserts the stage buffers and creates the control connections for each of the processing pipelines 830a, 830b, ... 830n independently. In the illustrated embodiment, respective outputs of each of the processing pipelines 830a, 830b, ... 830n are concatenated to produce a concatenated output, which in turn is processed through the G5 node (i.e., GeMM node 408).

Figure 9:
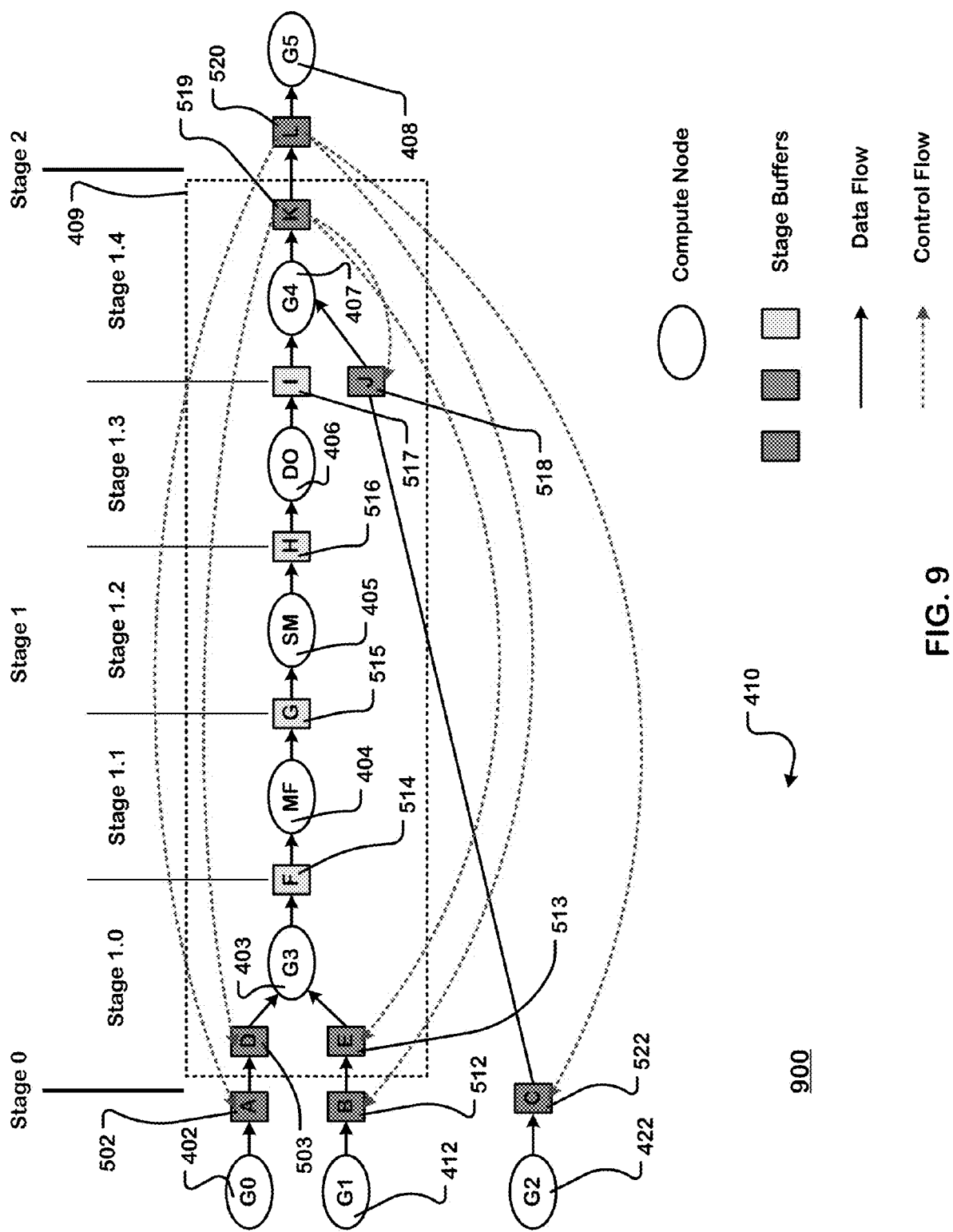
FIG. 9 is another embodiment of the compiler creating control connections between the stage buffers inserted in FIG. 5 for a sequential loop.

FIG. 9 is another embodiment of the compiler 120 creating control connections between the stage buffers inserted in FIG. 5 for a sequential loop. In some embodiments, the loop at the second level 409 is a sequential loop. In such embodiments, the compiler 120 configures the stage buffers inserted inside the loop at the second level 409 with a buffer depth of one, and extends the control connections inside the loop at the second level 409 only from the consumers that are at an egress point of the loop at the second level (e.g., stage buffer K (519)) to the producers that are at an ingress point of the loop at the second level (e.g., stage buffers D, E (503, 513)). Note that, in such embodiments, the yellow stage buffers do not have any control connections, and the control connections of the blue stage buffers stay the same as described with respect to FIG. 8A. In some embodiments, the yellow stage buffers may be eliminated. After the control connections are established in the dataflow graph 400 for the sequential loop embodiment, it becomes a control and dataflow graph 900.

Figure 10:
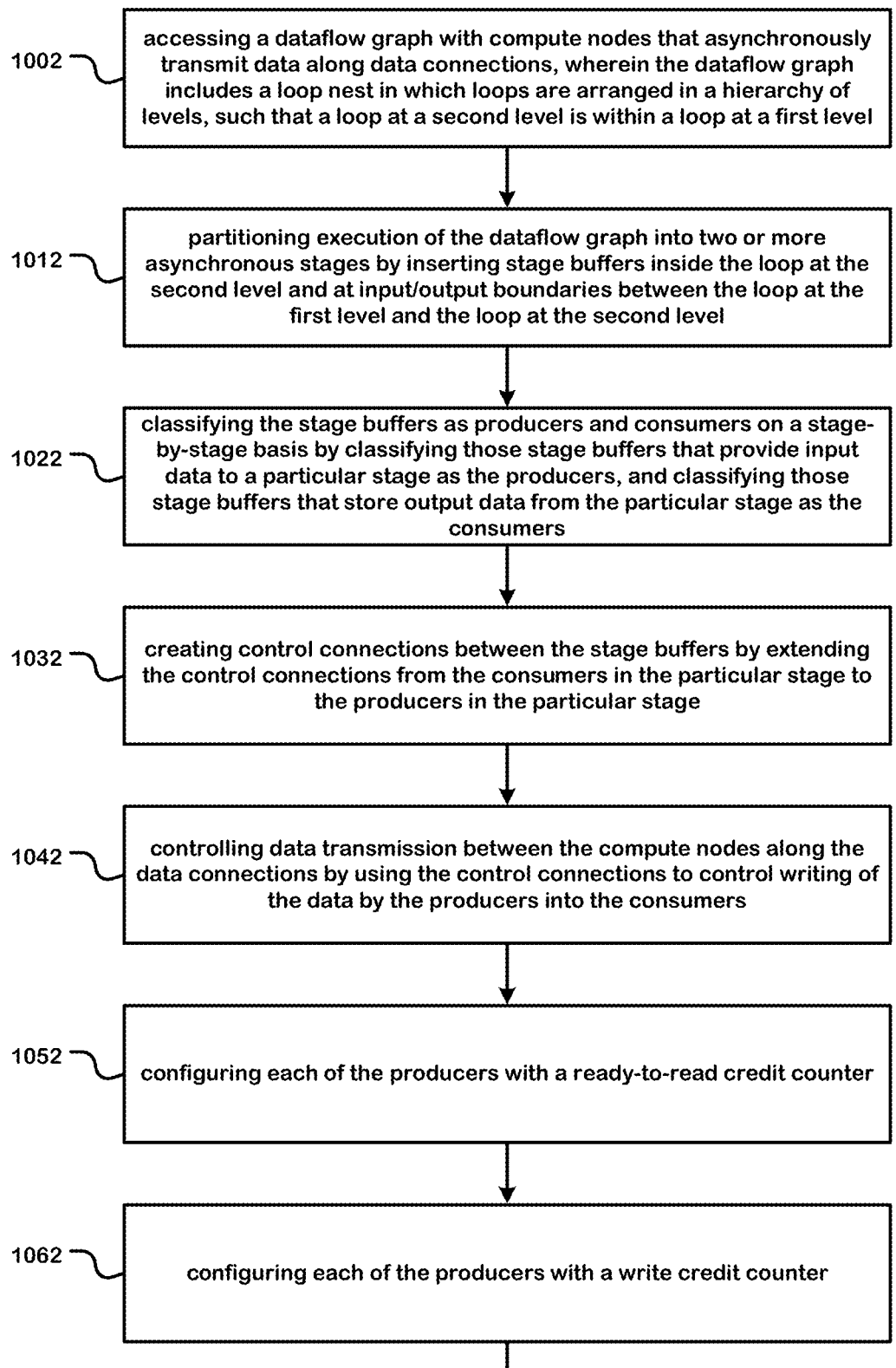
FIG. 10 is a flowchart depicting one embodiment of a method of controlling data transmission between compute nodes of a dataflow graph using the anti-congestion flow control described herein.

FIG. 10 is a flowchart depicting one embodiment of a method of controlling data transmission between compute nodes of a dataflow graph using the anti-congestion flow control described herein.

At action 1002, the method includes accessing a dataflow graph with compute nodes that asynchronously transmit data along data connections. The dataflow graph includes a loop nest in which loops are arranged in a hierarchy of levels, such that a loop at a second level is within a loop at a first level.

At action 1012, the method includes partitioning execution of the dataflow graph into two or more asynchronous stages by inserting stage buffers inside the loop at the second level and at input/output boundaries between the loop at the first level and the loop at the second level.

At action 1022, the method includes classifying the stage buffers as producers and consumers on a stage-by-stage basis by classifying those stage buffers that provide input data to a particular stage as the producers, and classifying those stage buffers that store output data from the particular stage as the consumers.

At action 1032, the method includes creating control connections between the stage buffers by extending the control connections from the consumers in the particular stage to the producers in the particular stage.

At action 1042, the method includes controlling data transmission between the compute nodes along the data connections by using the control connections to control writing of the data by the producers into the consumers.

At action 1052, the method includes (i) configuring each of the producers with a ready-to-read credit counter, (ii) initializing the ready-to-read credit counter of a particular producer with as many read credits as a buffer depth of a corresponding consumer that reads data from the particular producer, (iii) decrementing the ready-to-read credit counter when the particular producer begins writing a buffer data unit into the corresponding consumer along a data connection, and (iv) incrementing the ready-to-read credit counter when the particular producer receives from the corresponding consumer a read ready token along a control connection. The read ready token indicates to the particular producer that the corresponding consumer has freed a buffer data unit and is ready to receive an additional buffer data unit.

At action 1062, the method includes (i) configuring each of the producers with a write credit counter, (ii) initializing the write credit counter with one or more write credits, (iii) decrementing the write credit counter when the particular producer begins writing the buffer data unit into the corresponding consumer along the data connection, and (iv) incrementing the write credit counter when the particular producer receives from the corresponding consumer a write done token along the control connection. The write done token indicates to the particular producer that the writing of the buffer data unit into the corresponding consumer has completed.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

We disclose:
- A generic and automated mechanism to orchestrate execution of an arbitrary control and data flow graph (CDFG) with compute and memory components as a hierarchy of asynchronous pipelines and buffers.
- Algorithmically identifying input, intermediate, and output buffers that constitute a pipeline stage from a high-level CDFG containing only compute and buffer nodes.
- Inserting credit management logic at input buffers that takes into account the total depths of all output buffers.
- Inserting synchronization logic between input and output buffers to ensure correctness and eliminate the chance of data corruption or collision in stages.

Flow control to enable nested pipelines at arbitrary depths, where one or more stages of a pipeline can itself be a separate pipeline.

Flow control protocol to handle pipeline stages with internal buffers or other stateful computations.

Logic to handle diverging pipelines, where the same set of buffers serves as inputs to two or more pipelines which could execute in parallel. A common example is in handling skip connections in deep neural networks. Another common example is in deep learning training data paths, where the same set of weights input buffers feeds both the forward pass data path and the backward pass data path.

Protocol to handle sequential loops, or loops that cannot be pipelined due to inherent loop-carried dependencies.

Reconfigurable Processor

Figure 11:
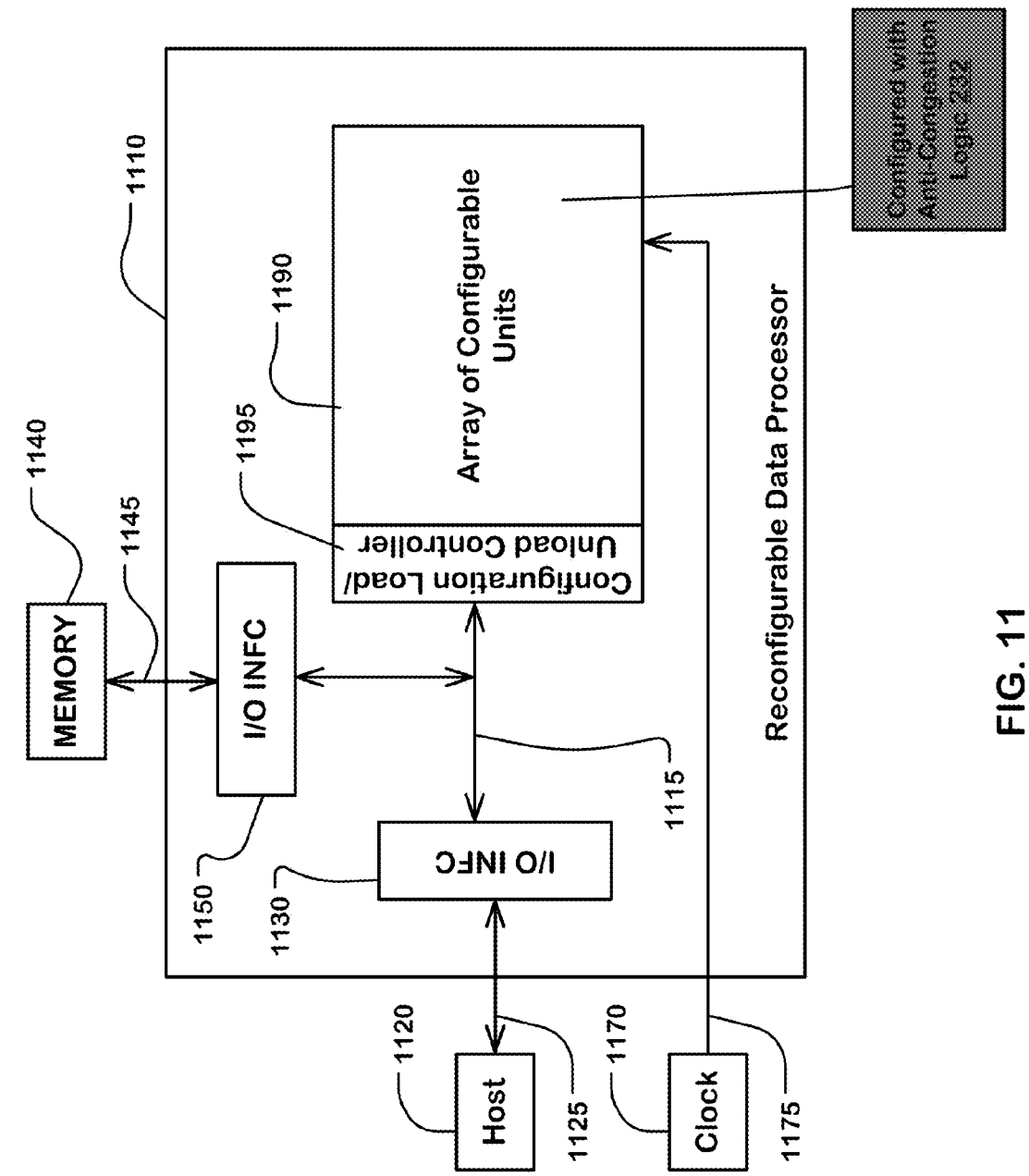
FIG. 11 is a system diagram illustrating a system including a host, a memory, and a reconfigurable data processor.

FIG. 11 is a diagram illustrating a system 1100 including a host 1120, a memory 1140, and a reconfigurable data processor 1110 in which a computation unit as described herein is deployed by hardware or by configuration of reconfigurable components and configured with the anti-congestion logic 232. As shown in the example of FIG. 11, the reconfigurable data processor 1110 includes an array 1190 of configurable units and a configuration load/unload controller 1195.

Figure 14:
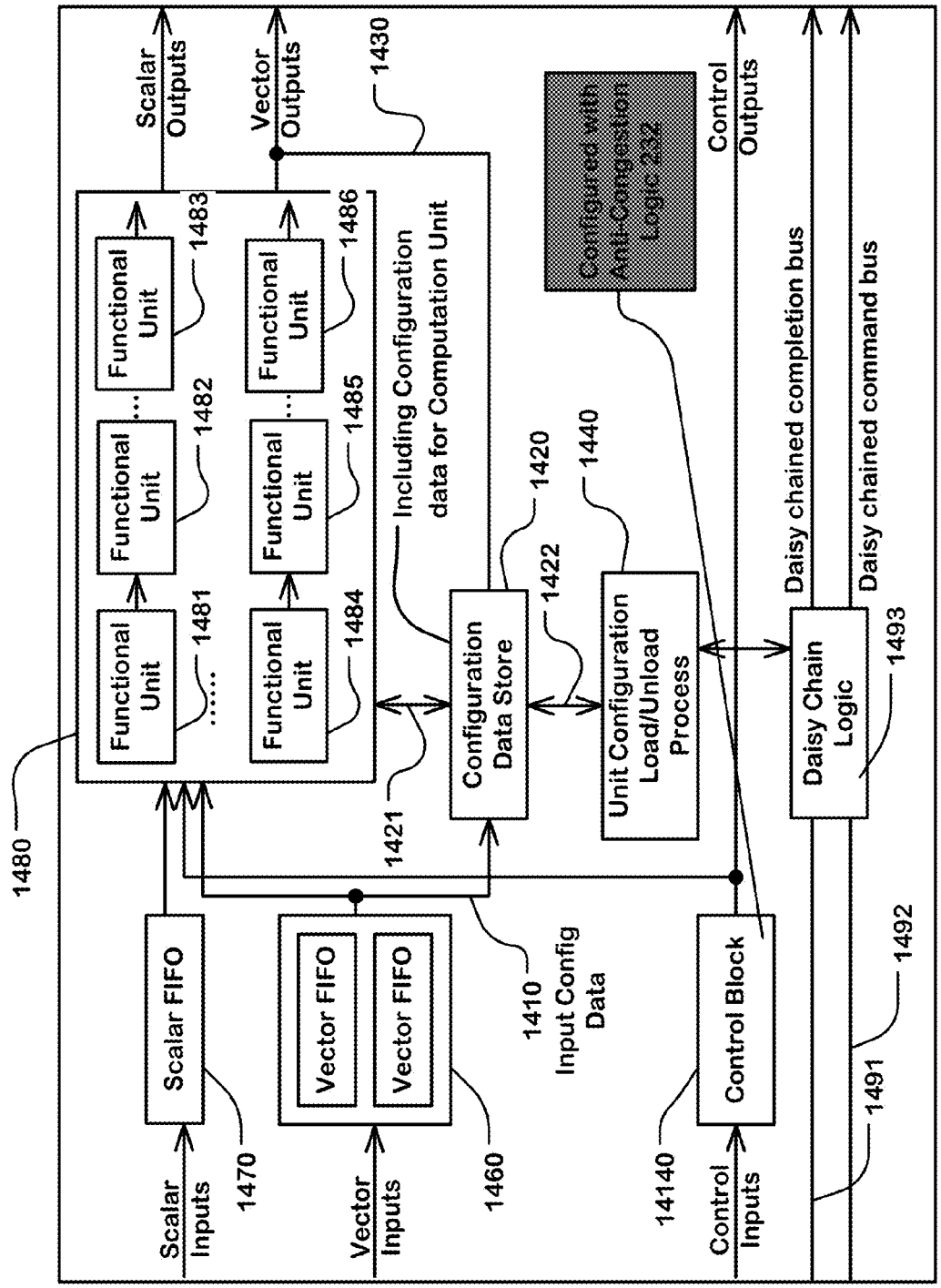
FIG. 14 is a block diagram illustrating an example configurable unit, such as a Pattern Compute Unit (PCU).
Figure 15:
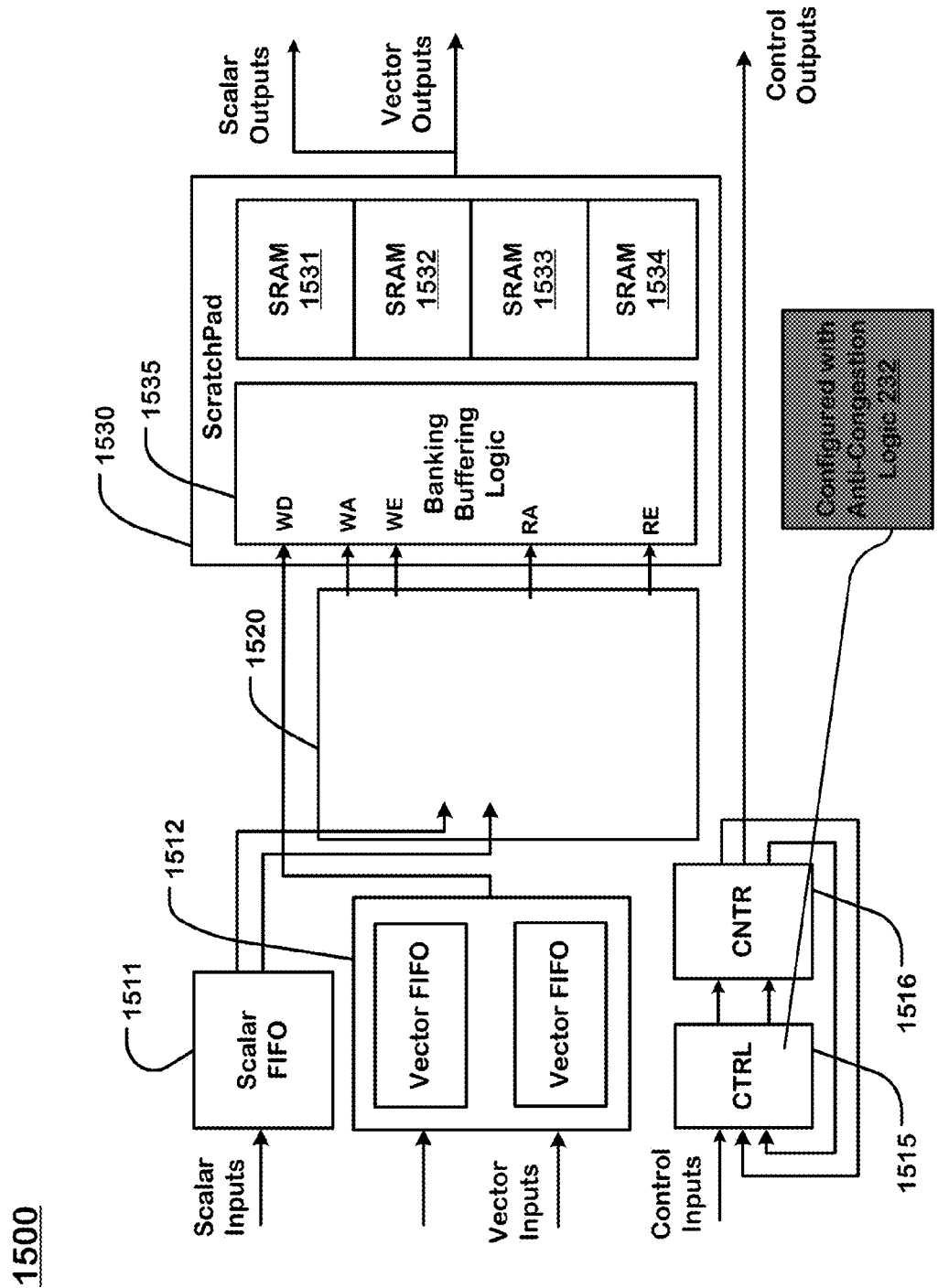
FIG. 15 is a block diagram illustrating an example configurable unit, such as a Pattern Memory Unit (PMU).

Configurable units in an array 1190 of configurable units are further described in reference to FIGS. 14 and 15 and configured with the anti-congestion logic 232. Configurable units can include, or can have units configured to implement, a computation unit or computation units, as described herein.

The processor 1110 includes an external I/O interface 1130 connected to the host 1120 by line 1125, and an external I/O interface 1150 connected to the memory 1140 by line 1145. The I/O interfaces 1130, 1150 connect via a bus system 1115 to the array 1190 of configurable units and to the configuration load/unload controller 1195. The bus system 1115 may have a bus width of carrying one chunk of data, which can be for this example 128 bits (references to 128 bits throughout can be considered as an example chunk size more generally).

To configure configurable units in the array 1190 of configurable units with a configuration file, the host 1120 can send the configuration file to the memory 1140 via the interface 1130, the bus system 1115, and the interface 1150 in the reconfigurable data processor 1110. The configuration file can be loaded in many ways, as suits a particular architecture, including in data paths outside the configurable processor 1110. The configuration file can be retrieved from the memory 1140 via the memory interface 1150. Chunks of the configuration file can then be sent in a distribution sequence to configurable units in the array 1190 of configurable units in the reconfigurable data processor 1110.

An external clock generator 1170 or other clock line sources can provide a clock line 1175 or clock lines to elements in the reconfigurable data processor 1110, including the array 1190 of configurable units, and the bus system 1115, and the external data I/O interfaces. The bus system 1115 can communicate data at a processor clock rate via a clock line 1175 or clock lines.

Figure 12:
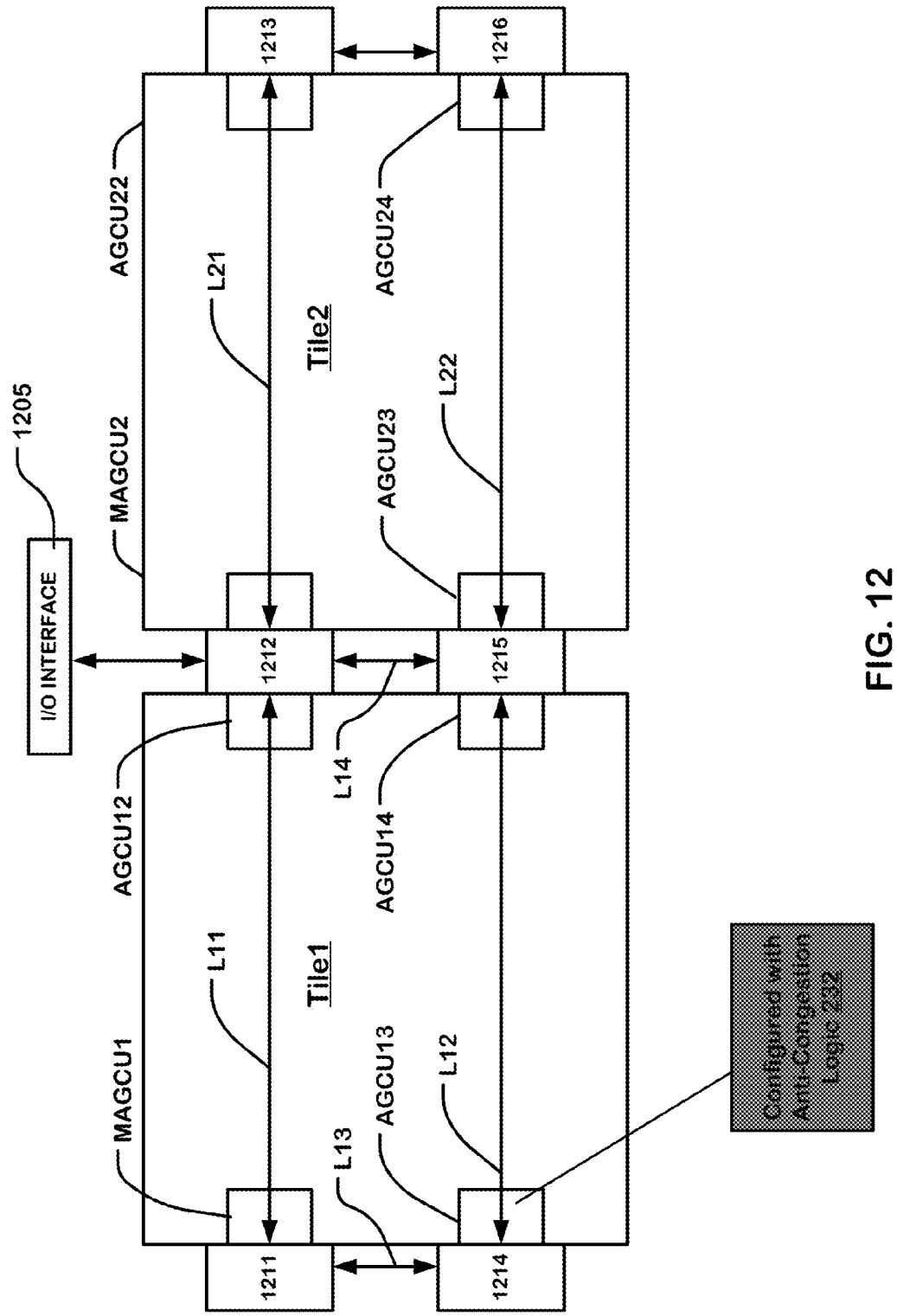
FIG. 12 is a simplified block diagram of a top-level network and components of a CGRA (coarse-grained reconfigurable architecture).

FIG. 12 is a simplified block diagram of components of a CGRA (coarse-grained reconfigurable architecture) processor. In this example, the CGRA processor has 2 tiles (Tile1, Tile2). The tile comprises an array of configurable units connected to a bus system, including array level networks in this example. An array of configurable units (e.g., 1190, FIG. 11) in the tile includes computation units in hardware or by configuration of reconfigurable components, which are configured with the anti-congestion logic 232. The bus system includes a top-level network connecting the tiles to external I/O interface 1205 (or any number of interfaces). In other embodiments, different bus system configurations may be utilized. The configurable units in each tile are nodes on the array level network in this embodiment.

Each of the tiles has 4 AGCUs (Address Generation and Coalescing Units) (e.g., MAGCU1, AGCU12, AGCU13, AGCU14). The AGCUs are nodes on the top-level network and nodes on the array level networks and include resources for routing data among nodes on the top-level network and nodes on the array level network in each tile.

Nodes on the top-level network in this example include one or more external I/Os, including interface 1205. The interfaces to external devices include resources for routing data among nodes on the top-level network and external devices, such as high-capacity memory, host processors, other CGRA processors, FPGA devices and so on, that are connected to the interfaces.

One of the AGCUs in a tile is configured in this example to be a master AGCU, which includes an array configuration load/unload controller for the tile. In other embodiments, more than one array configuration load/unload controller can be implemented, and one array configuration load/unload controller may be implemented by logic distributed among more than one AGCU.

The MAGCU1 includes a configuration load/unload controller for Tile1, and MAGCU2 includes a configuration load/unload controller for Tile2. In other embodiments, a configuration load/unload controller can be designed for loading and unloading configuration of more than one tile. In other embodiments, more than one configuration controller can be designed for configuration of a single tile. Also, the configuration load/unload controller can be implemented in other portions of the system, including as a stand-alone node on the top-level network and the array level network or networks.

The top-level network is constructed using top-level switches (1211-1216) connecting to each other as well as to other nodes on the top-level network, including the AGCUs, and I/O interface 1205. The top-level network includes links (e.g., L11, L12, L21, L22) connecting the top-level switches. Data travels in packets between the top-level switches on the links, and from the switches to the nodes on the network connected to the switches. For example, top-level switches 1211 and 1212 are connected by a link L11, top-level switches 1214 and 1215 are connected by a link L12, top-level switches 1211 and 1214 are connected by a link L13, and top-level switches 1212 and 1213 are connected by a link L21. The links can include one or more buses and supporting control lines, including for example a chunk-wide bus (vector bus). For example, the top-level network can include data, request and response channels operable in coordination for transfer of data in a manner analogous to an AXI compatible protocol. See, AMBA® AXI and ACE Protocol Specification, ARM, 2017.

Top-level switches can be connected to AGCUs. For example, top-level switches 1211, 1212, 1214, and 1215 are connected to MAGCU1, AGCU12, AGCU13 and AGCU14 in the tile Tile1, respectively. Top-level switches 1212, 1213, 1215, and 1216 are connected to MAGCU2, AGCU22, AGCU23 and AGCU24 in the tile Tile2, respectively.

Top-level switches can be connected to one or more external I/O interfaces (e.g., interface 1205).

Figure 13:
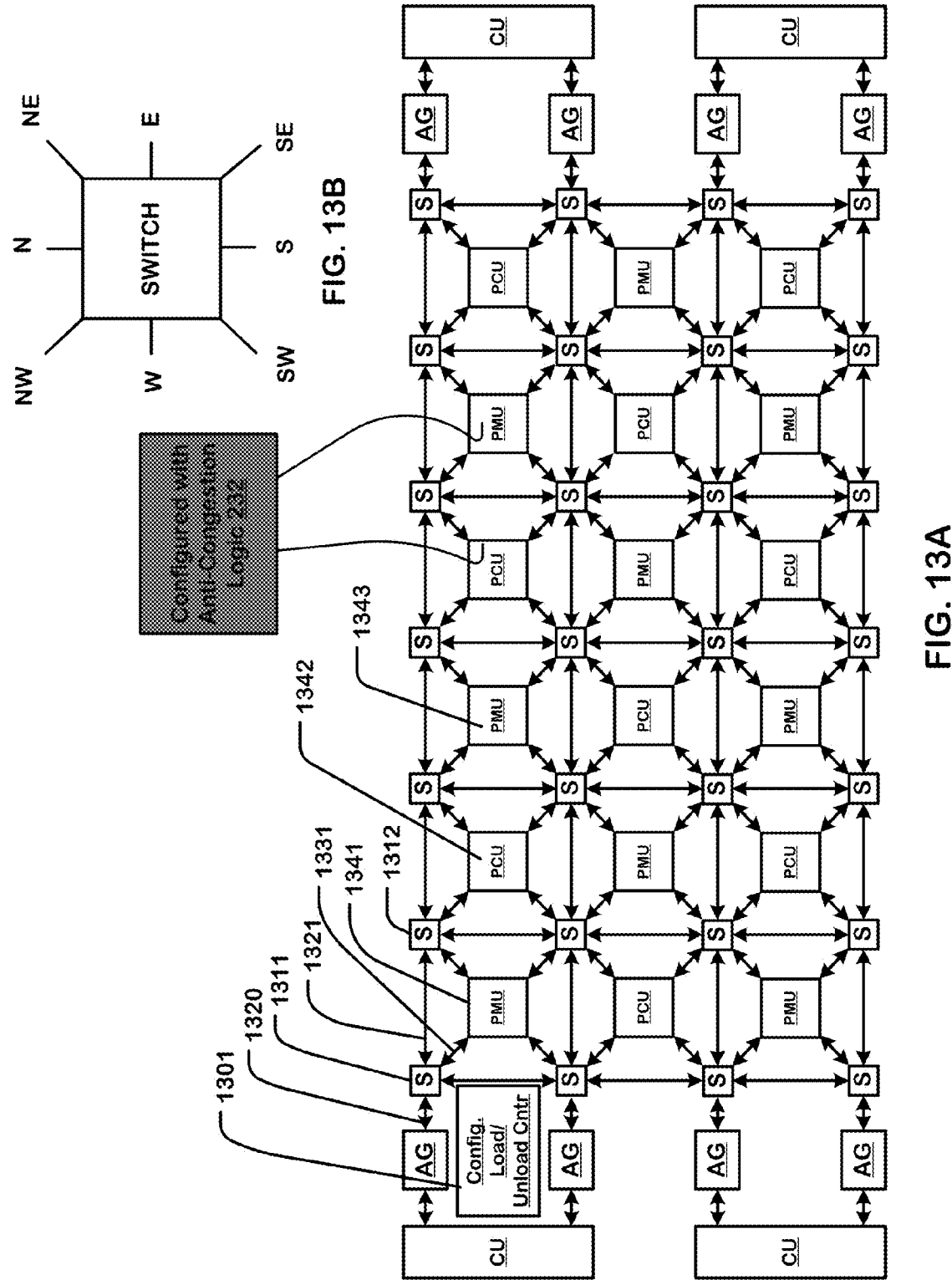
FIG. 13A is a simplified diagram of a tile and an array level network usable in the configuration of FIG. 11, where the configurable units in the array are nodes on the array level network and are configurable to implement the anti-congestion logic.
FIG. 13B illustrates an example switch unit connecting elements in an array level network.

FIG. 13A is a simplified diagram of a tile and an array level network usable in the configuration of FIG. 12, where the configurable units in the array are nodes on the array level network and are configurable to implement the anti-congestion logic 232.

In this example, the array of configurable units 1300 includes a plurality of types of configurable units, which are configured with the anti-congestion logic 232. The types of configurable units in this example, include Pattern Compute Units (PCU), Pattern Memory Units (PMU), switch units (S), and Address Generation and Coalescing Units (each including two address generators AG and a shared CU). For an example of the functions of these types of configurable units, see, Prabhakar et al., "Plasticine: A Reconfigurable Architecture For Parallel Patterns," ISCA '17, Jun. 24-28, 2017, Toronto, ON, Canada, which is incorporated by reference as if fully set forth herein. In this example, the PCUs (e.g., 1342) and PMUs (e.g., 1343) in the array of configurable units 1300 can include resources configurable for embodiment of a computation unit, an example configuration of which is described herein (FIGS. 8A, 8B, and 9). Each of these configurable units contains a configuration store comprising a set of registers or flip-flops that represent either the setup or the sequence to run a program, and can include the number of nested loops, the limits of each loop iterator, the routes and/or instructions to be executed for each stage including stages, the source of the operands, and the network parameters for the input and output interfaces. The configuration file can include entries of lookup tables as described herein.

Additionally, each of these configurable units contains a configuration store comprising a set of registers or flip-flops that store status usable to track progress in nested loops or otherwise. A configuration file in the configuration store contains a bit-stream representing the initial configuration, or starting state, of each of the components that execute the program. This bit-stream is referred to as a bit file. Program load is the process of setting up the configuration stores in the array of configurable units based on the contents of the bit file to allow the components to execute a program (i.e., a machine), including programs that utilize the anti-congestion logic 232. Program Load may also require the load of all PMU memories.

The array level network includes links interconnecting configurable units in the array. The links in the array level network include one or more and, in this case, three kinds of physical buses: a chunk-level vector bus (e.g., 128 bits of data), a word-level scalar bus (e.g., 32 bits of data), and a multiple bit-level control bus. For instance, interconnect 1321 between switch units 1311 and 1312 includes a vector bus interconnect with a vector bus width of 128 bits, a scalar bus interconnect with a scalar bus width of 32 bits, and a control bus interconnect.

The three kinds of physical buses differ in the granularity of data being transferred. In one embodiment, the vector bus can carry a chunk that includes 16-Bytes (=128 bits) of data as its payload. The scalar bus can have a 32-bit payload and carry scalar operands or control information. In some machines implemented using this system, data can be represented using floating point data formats, including standard or non-standard formats. Example formats include FP32 and BF16, among others. It can be understood that the number of data values carried on the scalar and vector buses is a function of the encoding format of the data values, with FP32 utilizing 32 bits per value and BF16 using 16 bits per value.

The control bus can carry control handshakes such as tokens and other lines. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit. The control network can be circuit switched based on timing circuits in the device, for example. The configuration load/unload controller can generate a header for each chunk of configuration data of 128 bits. The header is transmitted on a header bus to each configurable unit in the array of configurable unit.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can include:

A bit to indicate if the chunk is scratchpad memory or configuration store data.
Bits that form a chunk number.
Bits that indicate a column identifier.
Bits that indicate a row identifier.
Bits that indicate a component identifier.

For a load operation, the configuration load controller can send the number N of chunks to a configurable unit in order from N−1 to 0. For this example, the 6 chunks are sent out in most-significant-bit-first order of Chunk 5→Chunk 4→Chunk 3→Chunk 2→Chunk 1→Chunk 0. (Note that this most-significant-bit-first order results in Chunk 5 being distributed in round 0 of the distribution sequence from the array configuration load controller.) For an unload operation, the configuration unload controller can write out the unload data of order to the memory. For both load and unload operations, the shifting in the configuration serial chains in a configuration data store in a configurable unit is from LSB (least-significant-bit) to MSB (most-significant-bit), or MSB out first.

FIG. 13B illustrates an example switch unit connecting elements in an array level network. As shown in the example of FIG. 13B, a switch unit can have 8 interfaces. The North, South, East and West interfaces of a switch unit are used for connections between switch units. The Northeast, Southeast, Northwest and Southwest interfaces of a switch unit are each used to make connections to PCU or PMU instances. A set of 2 switch units in each tile quadrant have connections to an Address Generation and Coalescing Unit (AGCU) that include multiple address generation (AG) units and a coalescing unit (CU) connected to the multiple address generation units. The coalescing unit (CU) arbitrates between the AGs and processes memory requests. Each of the 8 interfaces of a switch unit can include a vector interface, a scalar interface, and a control interface to communicate with the vector network, the scalar network, and the control network.

During execution of a machine after configuration, data can be sent via one or more unit switches and one or more links between the unit switches to the configurable units using the vector bus and vector interface(s) of the one or more switch units on the array level network.

In embodiments described herein, a configuration file or bit file, before configuration of the tile, can be sent from the configuration load controller using the same vector bus, via one or more unit switches and one or more links between the unit switches to the configurable unit using the vector bus and vector interface(s) of the one or more switch units on the array level network. For instance, a chunk of configuration data in a unit file particular to a configurable unit PMU 1341 can be sent from the configuration load/unload controller 1301 to the PMU 1341, via a link 1320 between the configuration load/unload controller 1301 and the West (W) vector interface of the switch unit 1311, the switch unit 1311, and a link 1331 between the Southeast (SE) vector interface of the switch unit 1311 and the PMU 1341.

In this example, one of the AGCUs is configured to be a master AGCU, which includes a configuration load/unload controller (e.g., 1301). The master AGCU implements a register through which the host (1120, FIG. 11) can send commands via the bus system to the master AGCU. The master AGCU controls operations on an array of configurable units in a tile and implements a program control state machine to track the state of the tile based on the commands it receives from the host through writes to the register. For every state transition, the master AGCU issues commands to all components on the tile over a daisy-chained command bus (FIG. 11). The commands include a program reset command to reset configurable units in an array of configurable units in a tile, and a program load command to load a configuration file to the configurable units.

The configuration load controller in the master AGCU is responsible for reading the configuration file from the memory and sending the configuration data to every configurable unit of the tile. The master AGCU can read the configuration file from the memory at preferably the maximum throughput of the top-level network. The data read from memory are transmitted by the master AGCU over the vector interface on the array level network to the corresponding configurable unit according to a distribution sequence described herein.

In one embodiment, in a way that can reduce the wiring requirements within a configurable unit, configuration and status registers holding unit files to be loaded in a configuration load process, or unloaded in a configuration unload process, in a component are connected in a serial chain and can be loaded through a process of shifting bits through the serial chain. In some embodiments, there may be more than one serial chain arranged in parallel or in series. When a configurable unit receives the for example 128 bits of configuration data from the master AGCU in one bus cycle, the configurable unit shifts this data through its serial chain at the rate of 1 bit per cycle, where shifter cycles can run at the same rate as the bus cycle. It will take 128 shifter cycles for a configurable unit to load 128 configuration bits with the 128 bits of data received over the vector interface. The 128 bits of configuration data are referred to as a chunk. A configurable unit can require multiple chunks of data to load all its configuration bits.

The configurable units interface with the memory through multiple memory interfaces (1150, FIG. 11). Each of the memory interfaces can be accessed using several AGCUs. Each AGCU contains a reconfigurable scalar data path to generate requests for the off-chip memory. Each AGCU contains FIFOs (first-in-first-out buffers for organizing data) to buffer outgoing commands, data, and incoming responses from the off-chip memory.

FIG. 14 is a block diagram illustrating an example configurable unit 1400, such as a Pattern Compute Unit (PCU), which is configured with the anti-congestion logic 232 (i.e., the ready-to-read credit counter, the write credit counter, and the flow control logic for operating them). A configurable unit can interface with the scalar, vector, and control buses, in this example using three corresponding sets of inputs and outputs (10): scalar inputs/outputs, vector inputs/outputs, and control inputs/outputs. Scalar IOs can be used to communicate single words of data (e.g., 32 bits). Vector IOs can be used to communicate chunks of data (e.g., 128 bits), in cases such as receiving configuration data in a unit configuration load process and transmitting and receiving data during operation after configuration across a long pipeline between multiple PCUs. Control IOs can be used to communicate signals on control lines such as the start or end of execution of a configurable unit. Control inputs are received by control block 1470, and control outputs are provided by the control block 1470.

Each vector input is buffered in this example using a vector FIFO in a vector FIFO block 1460 which can include one or more vector FIFOs. Likewise, in this example, each scalar input is buffered using a scalar FIFO 1470. Using input FIFOs decouples timing between data producers and consumers and simplifies inter-configurable-unit control logic by making it robust to input delay mismatches.

A configurable unit includes multiple reconfigurable data paths in block 1480. A data path in a configurable unit can be organized as a multi-stage (Stage 1 . . . Stage N), reconfigurable SIMD (Single Instruction, Multiple Data) pipeline. The chunks of data pushed into the configuration serial chain in a configurable unit include configuration data for each stage of each data path in the configurable unit. The configuration serial chain in the configuration data store 1420 is connected to the multiple data paths in block 1480 via lines 1421.

A configurable data path organized as a multi-stage pipeline can include multiple functional units (e.g., 1481, 1482, 1483, 1484, 1485, 1486) at respective stages. A computation unit or parts of a computation unit can be implemented in multiple functional units at respective stages in a multi-stage pipeline or in multiple multi-stage pipelines, as described in FIG. 15. In the example as shown in FIG. 15, a circuit including the anti-congestion logic 232 can be implemented in multiple functional units and multiple memory units. Input registers in functional units can register inputs from scalar FIFOs 1470 or Vector FIFOs 1460 or from previous stages in a multi-stage pipeline. A functional unit at a stage in a multi-stage pipeline can execute a function, e.g., logical shift, an arithmetic function, comparison, a logical operation, etc., and generate an output.

Configurable units in the array of configurable units include configuration data stores 1420 (e.g., serial chains) to store unit files comprising a plurality of chunks (or sub-files of other sizes) of configuration data particular to the corresponding configurable units. Configurable units in the array of configurable units each include unit configuration load logic 1440 connected to the configuration data store 1420 via line 1422, to execute a unit configuration load process. The unit configuration load process includes receiving, via the bus system (e.g., the vector inputs), chunks of a unit file particular to the configurable unit and loading the received chunks into the configuration data store 1420 of the configurable unit. The unit file loaded into the configuration data store 1420 can include configuration data, including opcodes and routing configuration, for circuits (e.g., module) implementing the anti-congestion logic 232 in multiple functional units and multiple memory units, as described herein.

The configuration data stores in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series.

Input configuration data 1410 can be provided to a vector FIFO as vector inputs, and then be transferred to the configuration data store 1420. Output configuration data 1430 can be unloaded from the configuration data store 1420 using the vector outputs.

The CGRA uses a daisy-chained completion bus to indicate when a load/unload command has been completed. The master AGCU transmits the program load and unload commands to configurable units in the array of configurable units over a daisy-chained command bus. As shown in the example of FIG. 14, a daisy-chained completion bus 1491 and a daisy-chained command bus 1492 are connected to daisy-chain logic 1493, which communicates with the unit configuration load logic 1440. The daisy-chain logic 1493 can include load complete status logic, as described below. The daisy-chained completion bus is further described below. Other topologies for the command and completion buses are clearly possible but not described here.

FIG. 15 is a block diagram illustrating an example configurable unit 1500, such as a Pattern Memory Unit (PMU), which is configured with the anti-congestion logic 232 (i.e., the ready-to-read credit counter, the write credit counter, and the flow control logic for operating them). A PMU can contain scratchpad memory 1530 coupled with a reconfigurable scalar data path 1520 intended for address calculation (RA, WA) and control (WE, RE) of the scratchpad memory 1530, along with the bus interfaces used in the PCU (FIG. 14).

The bus interfaces can include scalar inputs, vector inputs, scalar outputs and vector outputs, usable to provide write data WD. The data path can be organized as a multi-stage reconfigurable pipeline, including stages of functional units FUs and associated pipeline registers PRs that register inputs and outputs of the functional units. PMUs can be used to store distributed on-chip memory throughout the array of reconfigurable units.

A scratchpad is built with multiple SRAM banks (e.g., 1531-1534). Banking and buffering logic 1535 for the SRAM banks in the scratchpad can be configured to operate in several banking modes to support various access patterns. A computation unit as described herein can include a lookup table stored in the scratchpad memory 1530, from a configuration file or from other sources. In a computation unit as described herein, the scalar data path 1520 can translate a section of a raw input value I for addressing lookup tables implementing a function f(I), into the addressing format utilized by the SRAM scratchpad memory 1530, adding appropriate offsets and so on, to read the entries of the lookup table stored in the scratchpad memory 1530 using the sections of the input value I. Each PMU can include write address calculation logic and read address calculation logic that provide write address WA, write enable WE, read address RA and read enable RE to the banking buffering logic 1535. Based on the state of the local FIFOs 1511 and 1512 and external control inputs, the control block 1515 can be configured to trigger the write address computation, read address computation, or both, by enabling the appropriate counters 1516. A programmable counter chain (Control Inputs, Control Outputs) and control block 1515 can trigger PMU execution.

This is one simplified example of a configuration of a configurable processor for implementing a computation unit as described herein. The configurable processor can be configured in other ways to implement a computation unit. Other types of configurable processors can implement the computation unit in other ways. Also, the computation unit can be implemented using dedicated logic in some examples, or a combination of dedicated logic and instruction-controlled processors.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A system, comprising:
   memory storing a dataflow graph with a plurality of compute nodes that asynchronously transmit data along data connections, wherein the dataflow graph includes a loop nest in which loops are arranged in a hierarchy of levels, such that a loop at a second level is within a loop at a first level; and
   a compiler having access to the memory and configured to:
   partition execution of the dataflow graph into two or more asynchronous stages by inserting stage buffers between compute nodes of the plurality of compute nodes that are inside the loop at the second level and at input/output boundaries between the loop at the first level and the loop at the second level;
   classify the stage buffers as producers and consumers on a stage-by-stage basis by classifying those stage buffers that provide input data to a particular stage as the producers, and classifying those stage buffers that store output data from the particular stage as the consumers, wherein the particular stage includes at least one compute node of plurality of compute nodes;
   create control connections between the stage buffers by extending the control connections from the consumers of the particular stage to the producers for the particular stage;
   configure each of the producers with a write credit counter that is initialized with one or more write credits and a ready-to-read credit counter initialized such that the ready-to-read credit counter of a particular producer has as many read credits as a buffer depth of a corresponding consumer that reads data from the particular producer; and
   control data transmission between the compute nodes along the data connections by using the control connections to control writing of the data by the producers into the consumers, such that writing is only performed when both the ready-to-read credit counter and the write credit counter are non-zero;
   wherein the ready-to-read credit counter is configured to decrement when the particular producer begins writing a buffer data unit into the corresponding consumer along a data connection,
   the ready-to-read credit counter and the write credit counter are both configured to decrement when the particular producer begins writing the buffer data unit into the corresponding consumer along the data connection,
   the ready-to-read credit counter is configured to increment when the particular producer receives from the corresponding consumer a read ready token along a control connection, the read ready token indicating that the corresponding consumer has freed a buffer data unit and is ready to receive an additional buffer data unit; and the write credit counter is configured to increment when the particular producer receives from the corresponding consumer a write done token along the control connection, the write done token indicating that the writing of the buffer data unit into the corresponding consumer has completed.

2. The system of claim 1, wherein the compiler is further configured to insert additional stage buffers inside the loop at the second level, and wherein the additional stage buffers are configured to interface with the stage buffers inserted at the input/output boundaries between the loop at the first level and the loop at the second level.

3. The system of claim 1, wherein the control connections extend from a particular consumer of the particular stage to one or more producers for the particular stage without passing through the at least one compute node of the particular stage.

4. The system of claim 1, wherein the particular producer stops writing data into the corresponding consumer when the ready-to-read credit counter has zero read credits.

5. The system of claim 1, wherein the particular producer resumes writing data into the corresponding consumer when the particular producer receives the read ready token from the corresponding consumer.

6. The system of claim 1, wherein the particular producer writes data into two or more corresponding consumers that have respective buffer depths, wherein the respective buffer depths include a minimum buffer depth, and wherein the ready-to-read credit counter is initialized with as many read credits as the minimum buffer depth.

7. The system of claim 1, wherein the particular producer stops writing data into the corresponding consumer when the write credit counter has zero write credits.

8. The system of claim 1, wherein the particular producer resumes writing data into the corresponding consumer when the particular producer receives the write done token from the corresponding consumer.

9. The system of claim 1, wherein a particular stage has two or more consumers and a set of producers, the compiler is further configured to create barrier connections that extend from the two or more of the consumers to the producers in the set of producers, and wherein the barrier connections control transmission of the read ready token and the write done token from the two or more of the consumers to the producers in the set of the producers.

10. The system of claim 1, wherein the loop at the second level is implemented with multiple parallel pipelines, the compiler is further configured to insert the stage buffers and create the control connections between the stage buffers respectively for each pipeline in the multiple parallel pipelines.

11. The system of claim 1, wherein the loop at the second level is a sequential loop, the compiler is further configured to configure the stage buffers inserted inside the loop at the second level with a buffer depth of one, and to extend the control connections inside the loop at the second level only from the consumers that are at an egress point of the loop at the second level to the producers that are at an ingress point of the loop at the second level.

12. The system of claim 1, wherein each of the asynchronous stages includes a subset of the compute nodes.

13. The system of claim 1, wherein the compiler is further configured to map each of the stage buffers to one or more pattern memory units (PMUs) of a reconfigurable processor.

14. The system of claim 13, wherein the compiler is further configured to map each of the compute nodes to one or more pattern compute units (PCUs) of the reconfigurable processor.

15. The system of claim 14, wherein the compiler is further configured to implement the data connections between the PMUs and the PCUs on a data network of the reconfigurable processor, the data network including a vector sub-network for transmission of vector data, and a scalar sub-network for transmission of scalar data.

16. The system of claim 13, wherein the compiler is further configured to implement the control connections between the PMUs on a control network of the reconfigurable processor.

17. The system of claim 1, the compiler further configured to insert the stage buffers between every compute node of the plurality of compute nodes that are inside the loop at the second level and at every input/output boundary between the loop at the first level and the loop at the second level.

18. The system of claim 1, wherein the compiler is further configured to insert producer interface stage buffers inside the loop at the second level that interface with the stage buffers inserted at the input boundaries of the loop at the second level from the loop at the first level, and to insert consumer interface stage buffers inside the loop at the second level that interface with the stage buffers inserted at the output boundaries of the loop at the second level to the loop at the first level.

19. The system of claim 18, wherein the loop at the second level is a sequential loop, the compiler is further configured to configure the stage buffers inserted between the compute nodes of the plurality of compute nodes that are inside the loop at the second level with a buffer depth of one, and to extend the control connections inside the loop at the second level only from the consumer interface stage buffers to the producer interface stage buffers.

20. A system, comprising:

memory storing a dataflow graph with compute nodes and memory nodes, the memory nodes including upstream memory nodes that provide input to the compute nodes, and downstream memory nodes that receive output from the compute nodes; and a compiler having access to the memory and configured to:

configure each of the memory nodes with a ready-to-read credit counter, the ready-to-read credit counter of a particular upstream memory node initialized with as many read credits as a buffer depth of a corresponding downstream memory node, the ready-to-read credit counter configured to decrement when the particular upstream memory node begins writing a buffer data unit into a corresponding compute node along a data line on a data bus, the ready-to-read credit counter configured to increment when the particular upstream memory node a read ready token along a control line on a control bus from a corresponding downstream memory node when the corresponding downstream memory node frees a buffer unit data; and configure each of the memory nodes with a write credit counter initialized with one or more write credits, the write credit counter of the particular upstream memory node configured to decrement when the particular upstream memory node begins writing the buffer data unit into the corresponding compute node along the data line, the write credit counter configured to increment when the particular upstream memory node receives a write done token along the control line from the corresponding downstream memory node when the corresponding downstream memory node finishes writing a buffer data unit into the corresponding downstream memory node.

21. The system of claim 20, wherein the read ready token indicates to the particular upstream memory node that the corresponding downstream memory node has freed a buffer data unit and is ready to receive an additional buffer data unit.

22. The system of claim 20, wherein the write done token indicates to the particular upstream memory node that the writing of the buffer data unit into the corresponding downstream memory node has completed.

23. The system of claim 20, the compiler further configured to enable the particular upstream memory node to wait to send a next buffer data unit to the corresponding downstream memory node until both the ready-to-read credit counter and the write credit counter are non-zero.

24. A computer-implemented method, including:
accessing a dataflow graph with a plurality of compute nodes that asynchronously transmit data along data connections, wherein the dataflow graph includes a loop nest in which loops are arranged in a hierarchy of levels, such that a loop at a second level is within a loop at a first level;
partitioning execution of the dataflow graph into two or more asynchronous stages by inserting stage buffers between compute nodes of the plurality of compute nodes that are inside the loop at the second level and at input/output boundaries between the loop at the first level and the loop at the second level;
classifying the stage buffers as producers and consumers on a stage-by-stage basis by classifying those stage buffers that provide input data to a particular stage as the producers, and classifying those stage buffers that store output data from the particular stage as the consumers, wherein the particular stage includes at least one compute node of plurality of compute nodes;
create control connections between the stage buffers by extending the control connections from the consumers of the particular stage to the producers for the particular stage;
configuring each of the producers with a write credit counter that is initialized with one or more write credits and a ready-to-read credit counter initialized such that the ready-to-read credit counter of a particular producer has as many read credits as a buffer depth of a corresponding consumer that reads data from the particular producer; and
controlling data transmission between the compute nodes along the data connections by using the control connections to control writing of the data by the producers into the consumers, such that writing is only performed when both the ready-to-read credit counter and the write credit counter are non-zero;
wherein the ready-to-read credit counter is configured to decrement when the particular producer begins writing a buffer data unit into the corresponding consumer along a data connection,
the ready-to-read credit counter and the write credit counter are both configured to decrement when the particular producer begins writing the buffer data unit into the corresponding consumer along the data connection, the ready-to-read credit counter is configured to increment when the particular producer receives from the corresponding consumer a read ready token along a control connection, the read ready token indicating that the corresponding consumer has freed a buffer data unit and is ready to receive an additional buffer data unit; and
the write credit counter is configured to increment when the particular producer receives from the corresponding consumer a write done token along the control connection, the write done token indicating that the writing of the buffer data unit into the corresponding consumer has completed.

25. A computer-implemented method, comprising:
accessing a dataflow graph with compute nodes and memory nodes, the memory nodes including upstream memory nodes that provide input to the compute nodes, and downstream memory nodes that receive output from the compute nodes;
configuring each of the memory nodes with a ready-to-read credit counter, initializing the ready-to-read credit counter of a particular upstream memory node with as many read credits as a buffer depth of a corresponding downstream memory node, decrementing the ready-to-read credit counter when the particular upstream memory node begins writing a buffer data unit into a corresponding compute node along a data line on a data bus, and incrementing the ready-to-read credit counter when the particular upstream memory node a read ready token along a control line on a control bus from a corresponding downstream memory node when the corresponding downstream memory node frees a buffer unit data; and
configuring each of the memory nodes with a write credit counter, initializing the write credit counter with one or more write credits, decrementing the write credit counter of the particular upstream memory node when the particular upstream memory node begins writing the buffer data unit into the corresponding compute node along the data line, and incrementing the write credit counter when the particular upstream memory node receives a write done token along the control line from the corresponding downstream memory node when the corresponding downstream memory node finishes writing a buffer data unit into the corresponding downstream memory node.

26. The computer-implemented method of claim 25, wherein the read ready token indicates to the particular upstream memory node that the corresponding downstream memory node has freed a buffer data unit and is ready to receive an additional buffer data unit.

27. The computer-implemented method of claim 25, wherein the write done token indicates to the particular upstream memory node that the writing of the buffer data unit into the corresponding downstream memory node has completed.

28. A computer-implemented method, comprising:
storing one or more buffer data units in a producer stage buffer of a dataflow graph being executed in a reconfigurable processor that includes a plurality of reconfigurable memory units and a plurality of reconfigurable compute units, the producer stage buffer utilizing at least a first reconfigurable memory unit of the plurality of reconfigurable memory units and writing buffer data units to a corresponding reconfigurable compute unit of a data flow graph;

initializing a ready-to-read credit counter in the producer stage buffer to a first value equal to a buffer depth of a corresponding consumer stage buffer of the dataflow graph, the corresponding consumer stage buffer utilizing at least a second reconfigurable memory unit of the plurality of reconfigurable memory units and receiving an output buffer data unit from the corresponding reconfigurable compute unit;

initializing a write credit counter of the producer stage buffer to a second number that is greater than zero;

sending a buffer data unit of the one or more buffer data units from the producer stage buffer to a corresponding reconfigurable compute unit over a first data bus of the reconfigurable processor and decrementing both the ready-to-read counter and the write credit counter in response to the sending of the buffer data unit;

outputting, over a second data bus of the reconfigurable processor, a buffer data unit from the corresponding reconfigurable compute unit to be written into the corresponding consumer stage buffer;

incrementing the write credit counter in response to receiving a write done token from the corresponding consumer stage buffer over a control bus of the reconfigurable processor when the corresponding consumer stage buffer has completed writing the buffer data unit; and incrementing the ready-to-read credit counter in response to receiving a read ready token from the corresponding consumer stage buffer over the control bus of the reconfigurable processor when the corresponding consumer stage buffer has emptied a buffer data unit; and determining that the producer stage buffer has at least one other buffer data unit of the one or more buffer data units remaining to send to the corresponding reconfigurable compute unit, waiting until both the ready-to-read credit counter and the write credit counter have non-zero values before sending the other buffer data unit from the producer stage buffer to the corresponding consumer stage buffer rover a data network of the reconfigurable processor, and decrementing both the ready-to-read counter and the write counter in response to the sending of the other buffer data unit.

29. The computer-implemented method of claim 28, further comprising:

receiving the buffer data unit over the second data bus of the reconfigurable processor at the corresponding consumer stage buffer and sending the write credit token from the corresponding consumer stage buffer over the control bus of the reconfigurable processor to the producer stage buffer in response; and removing the buffer data unit from the corresponding consumer stage buffer and sending the read ready token from the corresponding consumer stage buffer over the control bus of the reconfigurable processor to the producer stage buffer in response.

30. The computer-implemented method of claim 29, wherein:

the write credit token is sent over a first control line of the control bus of the reconfigurable processor; and the read ready token is sent over a second control line of the control bus of the reconfigurable processor.

31. The computer-implemented method of claim 28, wherein the second number is less than the first number.

\* \* \* \* \*